United States Patent
Do et al.

(10) Patent No.: US 11,516,751 B2
(45) Date of Patent: Nov. 29, 2022

(54) ADJUSTMENTS OF POWER SPECTRAL DENSITIES ASSOCIATED WITH A REFERENCE SIGNAL SEQUENCE IN A WIRELESS COMMUNICATION NETWORK

(71) Applicant: Telefonaktiebolaget LM Ericsson (publ), Stockholm (SE)

(72) Inventors: Hieu Do, Järfälla (SE); Wanlu Sun, San Diego, CA (US); Zhao Wang, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/262,582

(22) PCT Filed: Jul. 29, 2019

(86) PCT No.: PCT/SE2019/050712
§ 371 (c)(1),
(2) Date: Jan. 22, 2021

(87) PCT Pub. No.: WO2020/022948
PCT Pub. Date: Jan. 30, 2020

(65) Prior Publication Data
US 2021/0266846 A1   Aug. 26, 2021

Related U.S. Application Data

(60) Provisional application No. 62/703,897, filed on Jul. 27, 2018.

(51) Int. Cl.
*H04W 52/32* (2009.01)
*H04L 5/00* (2006.01)

(52) U.S. Cl.
CPC ......... *H04W 52/325* (2013.01); *H04L 5/0048* (2013.01)

(58) Field of Classification Search
CPC . H04W 52/325; H04W 52/383; H04W 88/04; H04L 5/001; H04L 5/0048; H04L 5/0051
See application file for complete search history.

(56) References Cited

U.S. PATENT DOCUMENTS

2010/0246561 A1* 9/2010 Shin .................... H04B 7/0691
375/267
2013/0028214 A1* 1/2013 Imamura ............. H04W 52/346
370/329

(Continued)

FOREIGN PATENT DOCUMENTS

EP        3200555 A1    8/2017
WO    2018012424 A1    1/2018

OTHER PUBLICATIONS

International Search Report and Written Opinion dated Oct. 21, 2019 for International Application No. PCT/SE2019/050712 filed Jul. 29, 2019, consisting of 11-pages.

(Continued)

*Primary Examiner* — Philip Sobutka
(74) *Attorney, Agent, or Firm* — Christopher & Weisberg, P.A.

(57) ABSTRACT

Method and arrangements, e.g. a device, relating to provision of adjustments of power spectral densities associated with a reference signal sequence in a wireless communication network. A single reference signal sequence is assigned to simultaneous transmissions of a plurality of physical channels, each physical channel occupying a different frequency region of a frequency range, each physical channel having different characteristics. An adjustment of a Power Spectral Density, PSD, of the single reference signal sequence is provided in each physical channel of the physical channels in the frequency region occupied by the physical channel.

18 Claims, 11 Drawing Sheets

(56) References Cited

U.S. PATENT DOCUMENTS

2014/0293900 A1* 10/2014 Takeda ................ H04L 5/0073
370/329
2019/0229964 A1 7/2019 Ouchi et al.

OTHER PUBLICATIONS

3GPP TSG RAN WG1 Meeting #86bis R1-1609373; Title: Discussion on the remaining issues for sidelink power control; Agenda item: 7.1.8; Source: Huawei, HiSilicon; Document for: Discussion and decision; Date and Location: Oct. 10-14, 2016, Lisbon, Portugal, consisting of 3-pages.
3GPP TS 38.214 V15.2.0; 3rd Generation Partnership Project; Technical Specification Group Radio Access Network NR; Physical layer procedures for data (Release 15); Jun. 2018, consisting of 95 pages.

\* cited by examiner

Transmission of wireless device 22a

Transmission of wireless device 22b

ADJUSTMENTS OF POWER SPECTRAL DENSITIES ASSOCIATED WITH A REFERENCE SIGNAL SEQUENCE IN A WIRELESS COMMUNICATION NETWORK

CROSS-REFERENCE TO RELATED APPLICATIONS

This application is a Submission Under 35 U.S.C. § 371 for U.S. National Stage Patent Application of International Application No.: PCT/SE2019/050712, filed Jul. 29, 2019 entitled "ADJUSTMENTS OF POWER SPECTRAL DENSITIES ASSOCIATED WITH A REFERENCE SIGNAL SEQUENCE IN A WIRELESS COMMUNICATION NETWORK," which claims priority to U.S. Provisional Application No. 62/703,897, filed Jul. 27, 2018, entitled "METHODS OF ADAPTING POWER SPECTRAL DENSITY FOR SIDELINK REFERENCE SIGNALS," the entireties of both of which are incorporated herein by reference.

TECHNICAL FIELD

The present disclosure relates to wireless communications, and in particular, to methods and devices relating to adjustment, such as by adapting, power spectral densities associated with a reference signal sequence in a wireless communication network, for example for communication over a sidelink between wireless devices.

BACKGROUND

Communication devices such as wireless communication devices, that simply may be named wireless devices, may also be known as e.g. User Equipments (UEs), mobile terminals, wireless terminals and/or mobile stations. A wireless device is enabled to communicate wirelessly in a wireless communication network, wireless communication system, or radio communication system, e.g. a telecommunication network, sometimes also referred to as a cellular radio system, cellular network or cellular communication system. The communication may be performed e.g. between two wireless devices, between a wireless device and a regular telephone and/or between a wireless device and a server via a Radio Access Network (RAN) and possibly one or more core networks, comprised within the cellular communication network. The wireless device may further be referred to as a mobile telephone, cellular telephone, laptop, Personal Digital Assistant (PDA), tablet computer, just to mention some further examples. Wireless devices may be so called Machine to Machine (M2M) devices or Machine Type of Communication (MTC) devices, i.e. devices that are not associated with a conventional user.

The wireless device may be, for example, portable, pocket-storable, hand-held, computer-comprised, or vehicle-mounted mobile device, enabled to communicate voice and/or data, via the RAN, with another entity, such as another wireless device or a server.

The wireless communication network may cover a geographical area which is divided into cell areas, wherein each cell area is served by at least one base station, or Base Station (BS), e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is typically identified by one or more cell identities. The base station at a base station site may provide radio coverage for one or more cells. A cell is thus typically associated with a geographical area where radio coverage for that cell is provided by the base station at the base station site. Cells may overlap so that several cells cover the same geographical area. By the base station providing or serving a cell is typically meant that the base station provides radio coverage such that one or more wireless devices located in the geographical area where the radio coverage is provided may be served by the base station in said cell. When a wireless device is said to be served in or by a cell this implies that the wireless device is served by the base station providing radio coverage for the cell. One base station may serve one or several cells. Further, each base station may support one or several communication technologies. The base stations communicate over the air interface operating on radio frequencies with the wireless device within range of the base stations.

In some RANs, several base stations may be connected, e.g. by landlines or microwave, to a radio network controller, e.g. a Radio Network Controller (RNC) in Universal Mobile Telecommunication System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communication (originally: Groupe Spécial Mobile), which may be referred to as 2nd generation or 2G.

UMTS is a third generation mobile communication system, which may be referred to as 3rd generation or 3G, and which evolved from the GSM, and provides improved mobile communication services based on Wideband Code Division Multiple Access (WCDMA) access technology. UMTS Terrestrial Radio Access Network (UTRAN) is essentially a radio access network using wideband code division multiple access for wireless devices. High Speed Packet Access (HSPA) is an amalgamation of two mobile telephony protocols, High Speed Downlink Packet Access (HSDPA) and High Speed Uplink Packet Access (HSUPA), defined by 3GPP, that extends and improves the performance of existing 3rd generation mobile telecommunication networks utilizing the WCDMA. Such networks may be named WCDMA/HSPA.

The expression downlink (DL) may generally be used for the transmission path from the wireless communication network, e.g. base station thereof, to the wireless device. The expression uplink (UL) may be used for the transmission path in the opposite direction i.e. from the wireless device to the wireless communication network, e.g. base station thereof.

In 3rd Generation Partnership Project (3GPP) Long Term Evolution (LTE), base stations, which may be referred to as eNodeBs or eNBs, may be directly connected to other base stations and may be directly connected to one or more core networks. LTE may be referred to as 4th generation or 4G.

The 3GPP has undertaken to evolve further the UTRAN and GSM based radio access network technologies, for example into evolved UTRAN (E-UTRAN) used in LTE.

Work is ongoing with developing a next generation wide area networks, which may be referred to as NeXt generation (NX), New Radio (NR), or fifth generation (5G).

Release 12 (Rel-12) of the 3GPP LTE standard was extended to support Device to Device (D2D), i.e. communication directly between wireless devices over a so called sidelink, specified as "sidelink" features targeting both commercial and public safety applications. Some applications enabled by Rel-12 LTE include device discovery, where a device can sense the proximity of another device and associated application by broadcasting and detecting discovery messages that carry device and application identities. Another application includes of direct communication based on physical channels terminated directly between devices.

By enhancing the D2D technology, the LTE vehicle-to-anything (V2X) functionality was first specified in 3GPP Release 14 and planned for enhancement for Release 15. LTE V2X supports several types of V2X communication including Vehicle-to-Vehicle (V2V), Vehicle-to-Pedestrian (V2P), Vehicle-to-Infrastructure (V2I), and Vehicle-to-Network (V2N).

The enhancements of Rel-12 D2D support V2X range from physical channel designs to system architecture in order to meet specific characteristics of vehicular communications, where one of the enhancement is the design of DeModulation Reference Signals (DMRS).

In Rel-14/15, the Physical Sidelink Control CHannel (PSCCH) carries Sidelink Control Information (SCI) which contains scheduling information for an associated data transmission, i.e., a Physical Sidelink Shared CHannel (PSSCH) transmission. The contents of the SCI include the allocated resources, Modulation and Coding Scheme (MCS), the retransmission index, the intention to reserve the same resources for a future data transmission, and the priority level of the data, e.g. ProSe Per-Packet Priority (PPPP). In LTE, the PSCCH has a fixed size of two resource blocks and is transmitted in the same sub frame with the scheduled data.

The PSSCH carries the transport block corresponding to a V2X message. Each transmission of a data transport block on the PSSCH is scheduled by its SCI on the PSCCH. Furthermore, each data transport block can be retransmitted at most once. The transmission parameters such as the number of resource blocks, the number of retransmission, and/or the MCS for a data transport block can be adapted based on the priority level, such as according to PPPP, congestion level of the carrier and/or the absolute speed of the transmitting vehicle, e.g. determined via the Global Positioning System (GPS). This is because in LTE, only broadcast transmission is supported for sidelink, which may be referred to as SideLink (SL), communications. This implies that both the data transport block and the associated SCI transmitted from one wireless device are intended for "all" other wireless devices and designed to be decodable for "all" other wireless device.

As indicated above, in V2X, the PSCCH and the PSSCH have been used to carry control information and data information, respectively, and they are potentially using different modulation and coding schemes. Also, to improve the reliability of the PSCCH transmission, there is a 3 dB power boosting of the PSCCH. In addition, Scheduling Assignments (SA), carried on the PSCCH, and its associated data, carried on the PSSCH, are transmitted in the same Transmission Time Interval (TTI). The SA occupies two consecutive resource blocks in the frequency domain, while the bandwidth for data can vary depending on the packet size.

To effectively mitigate severe Doppler effects due to the high speeds of vehicles, up to 250 km/h absolute speed, the number of DMRS in each sub frame has been increased from two for D2D to four for V2X. Specifically, for the PSCCH and the PSSCH, four symbols at the 3rd, 6th, 9th, and 12th position in a sub frame are used for DMRS. This dense DMRS configuration allows the receiver to track fast-changing channels effectively. Moreover, the PSCCH and the PSSCH use two different DMRS sequences and their channel estimations are performed separately. More specifically, some special Quadrature Phase Shift Keying (QPSK) based sequences are used for the PSCCH DMRS and Zadoff-Chu-based sequences are used for the PSSCH DMRS.

The LTE V2X design only aims at broadcast services. However, for 3GPP NR it is expected that unicast and multicast V2X transmissions will also become important since they are indeed needed for some enhanced (e) V2X use cases, e.g. regarding so called platooning, see-through, and cooperative maneuver.

SUMMARY

In view of the above, an object is to provide one or more improvements in relation to the prior art, in particular regarding sidelink communication between wireless devices.

According to a first aspect of embodiments herein, there is provided a method, performed by a device, for providing adjustments of power spectral densities associated with a reference signal sequence in a wireless communication network. The device assigns a single reference signal sequence to simultaneous transmissions of a plurality of physical channels, each physical channel occupying a different frequency region of a frequency range, each physical channel having different characteristics. The device provides an adjustment of a Power Spectral Density (PSD) of the single reference signal sequence in each physical channel of said physical channels in the frequency region occupied by the physical channel.

According to a second aspect of embodiments herein, there is provided a device for providing adjustments of power spectral densities associated with a reference signal sequence in a wireless communication network. The device is configured to assign a single reference signal sequence to simultaneous transmissions of a plurality of physical channels, each physical channel occupying a different frequency region of a frequency range, each physical channel having different characteristics. The device is further configured to provide an adjustment of a PSD of the single reference signal sequence in each physical channel of said physical channels in the frequency region occupied by the physical channel.

In some embodiments, said device according to the first and second aspect, may be a wireless device that provides the adjustment of the PSD by adjusting the PSD, i.e. adjusting the PSD of the single reference signal sequence in each physical channel of said physical channels in the frequency region occupied by the physical channel. In some embodiments, the PSD is being adjusted by the wireless device based on a PSD value signalled, e.g. transmitted by, a network node and that the wireless device has received.

In some embodiments, the device is instead a network node that provides the adjustment of PSD by signalling, e.g. transmitting, to one or more wireless devices a PSD value indicative of the adjustment of the PSD, i.e. adjustment of the PSD of the single reference signal sequence in each physical channel of said physical channels in the frequency region occupied by the physical channel. The signalling may be via Radio Resource Control (RRC) or Downlink Control Information (DCI).

According to a third aspect of embodiments herein, there is provided a method performed by a wireless device operating in a wireless communication network. The wireless device receives, from a device, e.g. a network node or another wireless device, information on an adjustment of a PSD of a single reference signal sequence in each of a plurality of physical channels in the frequency region occupied by the physical channel. Said single reference signal sequence being assigned to simultaneous transmissions of the plurality of physical channels, each physical channel occupying a different frequency region of a frequency range and having different characteristics.

According to a fourth aspect of embodiments herein, there is provided a wireless device configured to operate in a wireless communication network and to receive, from a device, e.g. a network node or another wireless device, information on an adjustment of a PSD of a single reference signal sequence in each of a plurality of physical channels in the frequency region occupied by the physical channel. Said single reference signal sequence being assigned to simultaneous transmissions of the plurality of physical channels, each physical channel occupying a different frequency region of a frequency range and having different characteristics.

According to a fifth aspect of embodiments herein, there is provided a computer program comprising computer program code that when executed by a device causes the device to perform the method according to the first aspect and/or the third aspect.

According to a sixth aspect of embodiments herein, there is provided a tangible computer readable medium comprising the computer program according to the fifth aspect.

Thanks to embodiments herein a single reference signal sequence may be used in the frequency domain but PSD be adjusted in each part of the bandwidth, e.g. according to the type of information carried in that part, such as based on the different characteristics of the physical channels.

Embodiments herein may be particularly advantageous to apply in case of unicast and multicast over sidelink, which for example may be the case for V2X in a NR wireless communication network in addition to broadcast over sidelink as for V2X in LTE wireless communication networks. In case of unicast and multicast, blind decoding of the PSCCH may not be needed, e.g. when the PSCCH carries non-scheduling information, such as feedback information, including ACK/NACK feedback and/or CSI report. A single DMRS port and single reference signal sequence can then be used for PSCCH and PSSCH. To achieve desirable reliability that typically is different for control and data, different MCS for control and data may be used, but this may not be sufficient. However, thanks to embodiments herein and that the PSD is adjusted of the single reference signal sequence in each physical channel in the frequency region occupied by the physical channel, desirable and different reliability can be accomplished for the PSCCH and PSSCH.

Further, due to the different characteristics, resource elements may benefit from different channel estimation performance. For example, a channel estimation algorithm using a longer single sequence, such as in embodiments herein, will give better performance against noise and/or interference than if e.g. a wireless device were using two short reference signal sequences separately. In particular, the impact of noise can be better suppressed by averaging over a larger number of samples in frequency. An equivalent effect can be achieved in the time domain. This advantage may be particularly useful for channels having a small number of allocated resource blocks.

Embodiments herein thus enable improved performance against noise and/or interference, and/or more flexibility and improvements compared to e.g. using multiple reference signal sequences and DMRS port. As explained herein, this may be particularly advantageous regarding sidelink communication between wireless devices.

Hence, wireless connectivity can thus be improved thanks to embodiments herein as well as improved provision of services over wireless connections utilizing embodiments herein.

BRIEF DESCRIPTION OF THE DRAWINGS

Examples of embodiments herein are described in more detail with reference to the appended schematic drawings, which are briefly described in the following.

DETAILED DESCRIPTION

Figure 1:
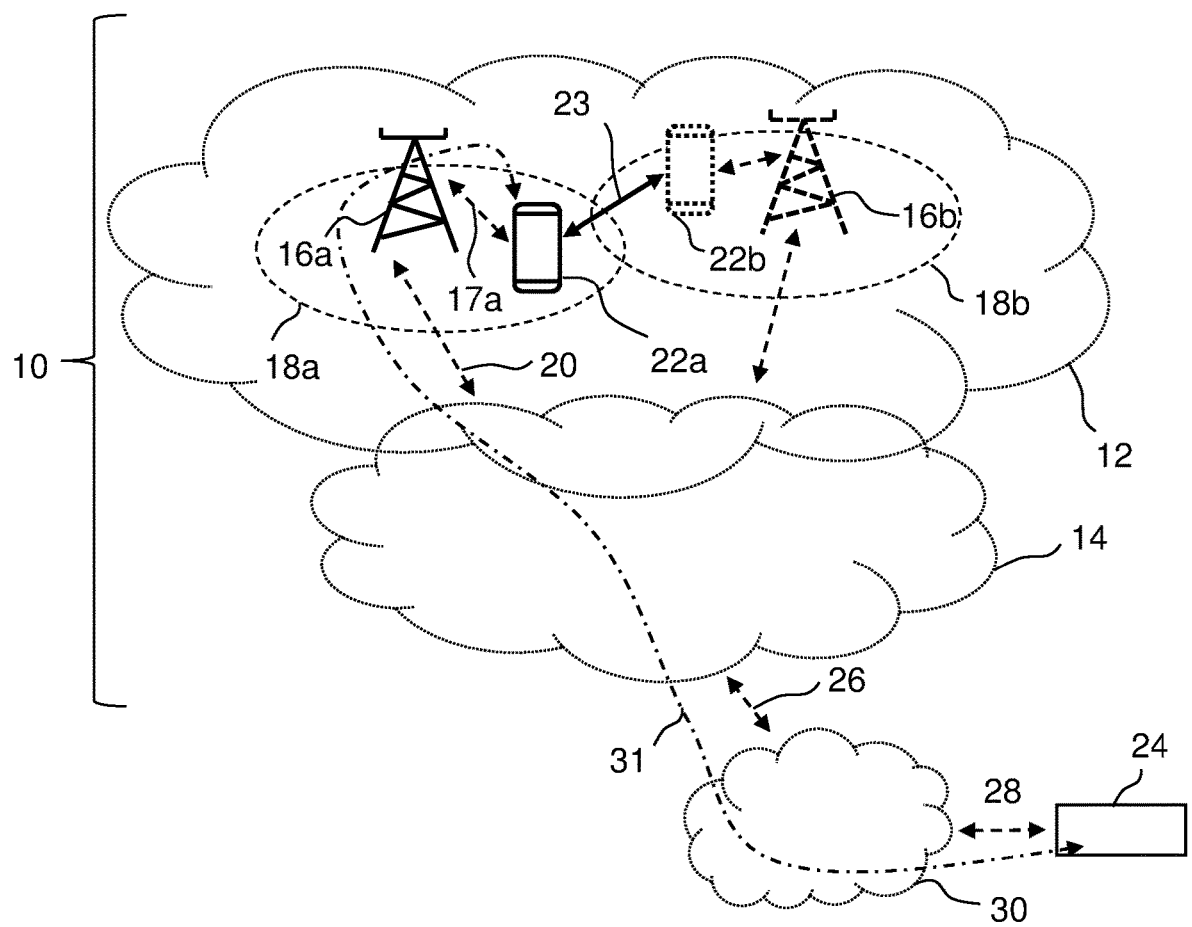
FIG. 1 is a block diagram schematically depicting an exemplary communication system to be used for discussing embodiments herein.

As a development towards embodiments herein, the situation indicated in the Background will first be further elaborated upon.

To enable more efficient unicasting and multicasting, feedback information including ACKknowledgement/Non-ACKnowledgement (ACK/NACK) feedback and Channel State Information (CSI) reports can be useful. In general, feedback information can be carried on either control channel, e.g. PSCCH or its variant, or data channel, e.g. PSSCH. Compared to conventional data transmission, the reliability of the transmission of feedback information cannot be enhanced by utilizing retransmission protocols. Hence, more robust one-shot transmission of feedback information is desirable or even needed.

As described above, blind decoding of the PSCCH may be useful. However, in NR V2X, due to expected increased number of control information types, e.g. ACK/NACK feedback, CSI report, that are potentially carried on the PSCCH, blind decoding is not needed for some types of PSCCH.

In NR, for enhanced Mobile BroadBand (eMBB), the L1/L2 control information may be conveyed in two channels, for instance, the control channel and shared channel, respectively. In some scenarios, the control information can also be transmitted in the data channel with or without the multiplexing of data in the shared channel. Taking the Uplink Control Information (UCI) as an example, the UCI may be placed in two different channels, namely, the Physical Uplink Control CHannel (PUCCH) and Physical Uplink Shared CHannel (PUSCH). Different antenna ports are defined for the DMRS ports in the two channels. 3GPP has specified the following antenna ports for the uplink:

- Antenna ports starting with 0 for the PUSCH and associated demodulation reference signals
- Antenna ports starting with 2000 for the PUCCH Typically different DMRS ports are used for the control channel and the shared channel. Therefore, the DMRS ports may go through different precoding, power-boosting, and user independent sequence generation and resource mapping.

For NR eMBB, the reference signal sequences are mapped to the resource elements with an amplitude scaling factor for power control of reference signals. Power control of reference signals is performed by defining the relative power difference of the Reference Signal (RS) resource element with respect to the power of the data resource element.

As has been specified by 3GPP, see e.g. TS 38.214 V15.2.0 (2018-06), section 4 "Power control" and section 6.2.2 "UE DM-RS transmission procedure", the amplitude scaling factor represents a relative power difference of the pilot Resource Element (RE) and data payload RE. For each DMRS port, this relative difference is the same across all REs transmitted in the same port.

Both LTE and NR technologies allow multiplexing in the frequency domain of not only transmissions from multiple users but also transmissions from the same user. The latter case means a user equipment uses some subcarriers in its obtained bandwidth to transmit a physical channel and uses some other subcarriers to transmit another physical channel. Often these physical channels carry information with different characteristics, for example one channel for control information and another channel for data. In this case there are basically two ways of designing the associated demodulation reference signals, i.e. DMRS, also known as pilot signals, for the physical channels.

In the first way, each physical channel has its own DMRS sequence. The DMRS design for the PSCCH and the PSSCH for V2X has in the prior art belonged to this category. A drawback of this design is that the number of pilot samples provided by an individual sequence may not be enough to provide accurate Channel Estimation (CE) against noise/interference. If the PSCCH is allocated a small number of Resource Blocks (RBs) in frequency, e.g. 2 RBs for PSCCH, the capability of filtering out the noise from the pilot signal of the PSCCH will be very limited because of insufficient number of noisy samples in the frequency domain. Note that this way of DMRS design has been natural for V2X in the past since the PSCCH has been carrying the Scheduling Assignment (SA) which needs to be blindly decoded. However, in NR V2X, this type of DMRS design may not be necessary and beneficial for the PSCCH if the PSCCH is used to carry non-scheduling information, such as feedback, including ACK/NACK feedback and/or CSI report. In such a case, the PSCCH and PSSCH may use the same precoder and the same DMRS port, since blind decoding of the PSCCH is not needed.

In the second way, a single DMRS port is used for the two types of information simultaneously, with even power spectral density across the transmission bandwidth. To achieve different levels of reliability, various coding and modulation schemes are used for control and data. However, only adjusting the MCS of control and data may not be sufficient. The control element (CE) performance may set another fundamental limit on demodulation and decoding performance.

Below, embodiments herein will be illustrated by exemplary embodiments. It should be noted that these embodiments are not necessarily mutually exclusive. Details from one embodiment may be tacitly assumed to be present in another embodiment and it will be obvious to a person skilled in the art how those components may be used in the other exemplary embodiments. Further, throughout the following description similar reference numerals may be used to denote similar elements, units, modules, circuits, nodes, parts, items or features, when applicable. Features that appear only in some embodiments of what is shown in a figure, are typically indicated by dashed lines in the drawings.

Embodiments herein may be described as residing primarily in combinations of method actions and apparatus components related to adjusting, such as adapting, power spectral densities, such as for sidelink reference signals. Accordingly, details, such as components, are represented where appropriate by conventional symbols in the drawings, focusing on those specific details that are pertinent to understanding the embodiments so as not to obscure the disclosure with details that will be readily apparent to those of ordinary skill in the art having the benefit of the description herein In general, embodiments herein may be used for configuration of reference signals for simultaneous transmissions of different types of information.

Embodiments herein may be described as involving a single reference signal sequence in the frequency domain but adjust the power spectral density in each part of the bandwidth e.g. according to the type of information carried in that part. For example, part of the bandwidth may carry conventional data that can benefit from a retransmission protocol, while some other part may carry control information that can only rely on one-shot transmission. Due to the different characteristics, these resource elements may benefit from different channel estimation performance that can be provided thanks to embodiments herein despite a single reference signal sequence being used.

Based on embodiments herein, a single reference signal sequence may be assigned to simultaneous transmissions of a plurality of physical channels, each physical channel occupying a different frequency region of a frequency range, each physical channel having different characteristics. A Power Spectral Density (PSD) of each physical channel may then be adjusted in the frequency region occupied by the physical channel.

More specifically, a single DMRS sequence may be used for two or more frequency-multiplexed physical channels so that a channel equalizer can use all frequency domain samples to suppress noise/interference, which benefits all channels, especially the channels with a small number of subcarriers. At the same time, the PSD may be adapted within the single DMRS sequence so that a channel estimation performance specifically required for the associated physical channel can be achieved.

Embodiments herein are associated with at least the following advantages:

improved channel estimation performance by using more samples within a whole bandwidth that is applied at the DMRS port;

achievement of improved channel estimation performance for an associated physical channel, which is sometimes referred to as content-specific channel estimation performance;

pilot contamination can be reduced even if different transmissions overlap;

proper Reference Signal Received Power (RSRP) measurements can be performed within the sensing and resource selection process even if different transmissions coexist with the same resource pool.

Also note that solutions described herein are mainly discussed and presented in the context of sidelink communications, but can be advantageously applied to other wireless communication scenarios, e.g. where reference signals may be configured for simultaneous transmissions of different types of information.

More particularly, embodiments may relate to:

assigning a single RS sequence to multiple physical channels that are transmitted at the same time and are multiplexed in the frequency domain, adjusting, e.g. adaptively, the PSD of subcarriers carrying the RS sequence based on the characteristics of the corresponding physical channels and/or e.g. of the information being carried by those subcarriers.

FIG. 1 is a schematic block diagram relating to a communication system for wireless communication, to be used for discussing and exemplifying embodiments herein in further detail, and in which embodiments herein may be implemented. The communication system comprises a wireless communication network 10, The wireless communication network 10 may be a 3GPP-type cellular network that may support standards such as LTE and/or NR (5G). It may comprise an access network, such as a RAN 12, and a Core Network (CN) 14. The RAN 12 may comprises a plurality of network nodes 16a, 16b. Each or all of the network nodes 16a-b may be referred to as network node(s) 16, and may be radio network nods such as NBs, eNBs, gNBs, or other types of wireless access points, where each may define or be associated with a corresponding coverage area 18a, 18b, 18c, which may be referred to collectively as coverage areas 18. Each network node 16a, 16b may be connectable to the core network 14 over wired and/or wireless connection(s) 20. A wireless device 22a shown located in coverage area 18a may be configured to wirelessly connect to, and/or be paged by, the corresponding network node 16a, e.g. via a wireless connection 23. A wireless device 22b in coverage area 18b may similarly be wirelessly connected or connectable to the corresponding network node 16b etc. Each or all of the wireless devices 22a-b may be referred to as wireless device 22. Also, the wireless devices 22a and 22b may communicate with each other wirelessly, e.g. be communicatively connectable or in communication with each other, such as directly over a wireless connection 23, e.g. a so called sidelink wireless connection, or simply sidelink, i.e. a link for direct communication between the wireless devices. Note that although only two wireless devices 22 and two network nodes 16 are shown, the wireless communication network 10 may, as should be understood include many more wireless devices 22 and network nodes 16, with, for example, one wireless device communicating simultaneously with a plurality of other wireless devices.

Also, it is contemplated that a wireless device 22 can be in simultaneous communication and/or configured to separately communicate with more than one network node 16 and more than one type of network node 16. For example, a wireless device 22 may have dual connectivity with a network node 16 that supports LTE and the same or a different network node 16 that supports NR. As an example, a wireless device 22 may be in communication with or communicatively connectable to an eNB for LTE/E-UTRAN, a gNB for NR/NG-RAN, and another wireless device over sidelink, Further, the wireless communication network 10 may be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The figure also shows connections 26, 28 for communication may be between the wireless communication network 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

Figure 4:
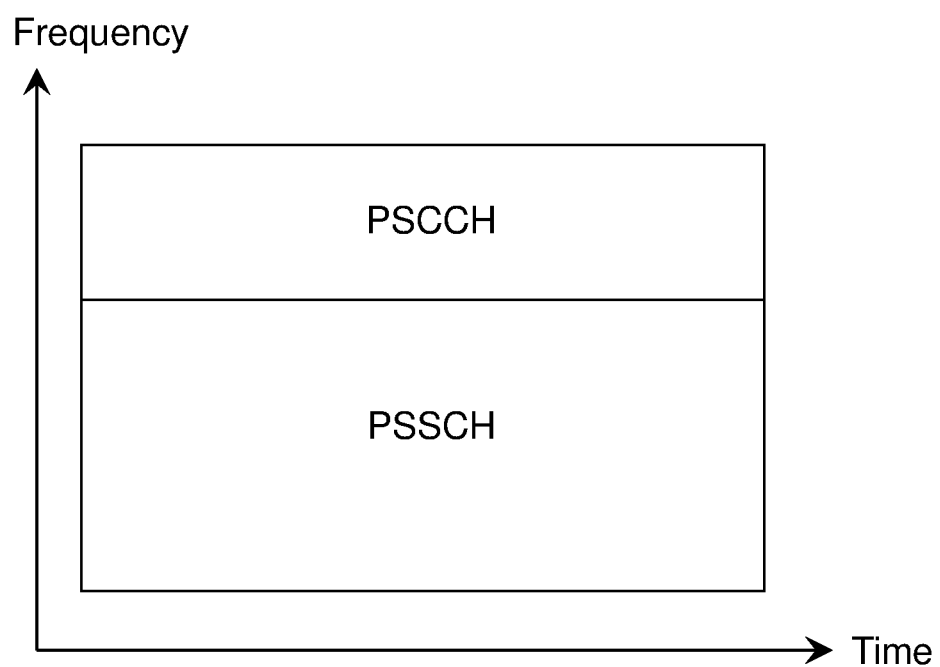
FIG. 4 is a schematic illustration of simultaneous PSCCH and PSSCH.

The communication system of FIG. 4 may enable connectivity between e.g. one of the wireless devices 22 and the host computer 24. The connectivity may be described as an Over-The-Top (OTT) connection, exemplified in the figure as an OTT connection 31, that thus is utilizing the wireless communication network for example for provision of services to the wireless devices 22a and/or 22b. The host computer 24 and the wireless devices 22a, 22b may be configured to communicate data and/or signaling via the OTT connection, using the access network 12, the core network 14, any intermediate network and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded to a connected wireless device. Similarly, the network node 16 may need not be aware of the future routing of an outgoing uplink communication originating from the wireless device towards the host computer 24.

Attention is drawn to that FIG. 1 are only schematic and for exemplifying purpose and that not everything shown in the figure may be required for all embodiments herein, as should be evident to the skilled person. Also, a wireless communication network or networks that correspond(s) to the wireless communication network 10, will typically comprise several further network nodes, such as further radio network nodes, e.g. base stations, network nodes, e.g. both radio and core network nodes, involve further wireless devices etc., as realized by the skilled person, but which are not shown herein for the sake of simplifying.

Figure 2:
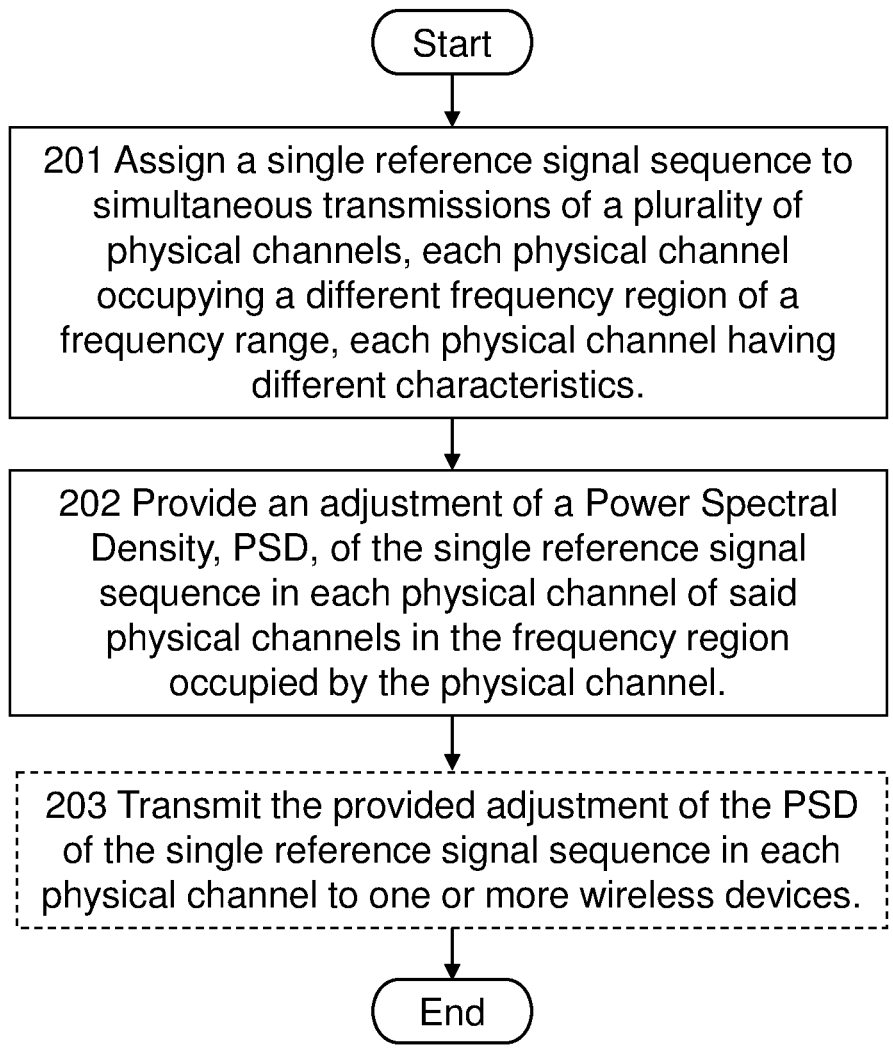
FIG. 2 is a flowchart for describing method and actions according embodiments herein.

FIG. 2 is a flowchart schematically illustrating actions related to embodiments herein, e.g. a method or an exemplary process in, such as implemented by and/or performed by, a device. Said method or process is for providing adjustments of PSDs associated with a reference signal sequence in a wireless communicator network, e.g. the wireless communication network 10.

In some embodiments the device is a wireless device, e.g. the wireless device 22a. The wireless device may be configured to communicate with another wireless device, e.g. over a so called sidelink, e.g. wireless device 22a with wireless device 22b. When said device is a wireless device, said method or process may more specifically be for adjusting, such as adapting, power spectral densities for sidelink reference signals.

In some embodiments the device is instead a network node, e.g. the radio network node 16a discussed above, such as a eNB or gNB.

Action 201

The device assigns a single reference signal sequence to simultaneous transmissions of a plurality of physical channels, each physical channel occupying a different frequency region of a frequency range, each physical channel having different characteristics.

As should be realized, said single reference signal sequence may be for communication with a wireless device over a sidelink, e.g. the sidelink 23 between the wireless devices 22a and 22b.

Further, the reference signal sequence may be a DMRS sequence, as further exemplified and discussed below.

A first physical channel of said plurality of physical channels may carry data information and a second physical channel of said plurality of physical channels may carry control information. Said physical channels may comprise a Physical Sidelink Control Channel (PSCCH) and a Physical Sidelink Shared CHannel (PSSCH), and/or a Physical Sidelink Feedback Channel (PSFCH) and a Physical Sidelink Shared CHannel (PSSCH).

Figure 3:
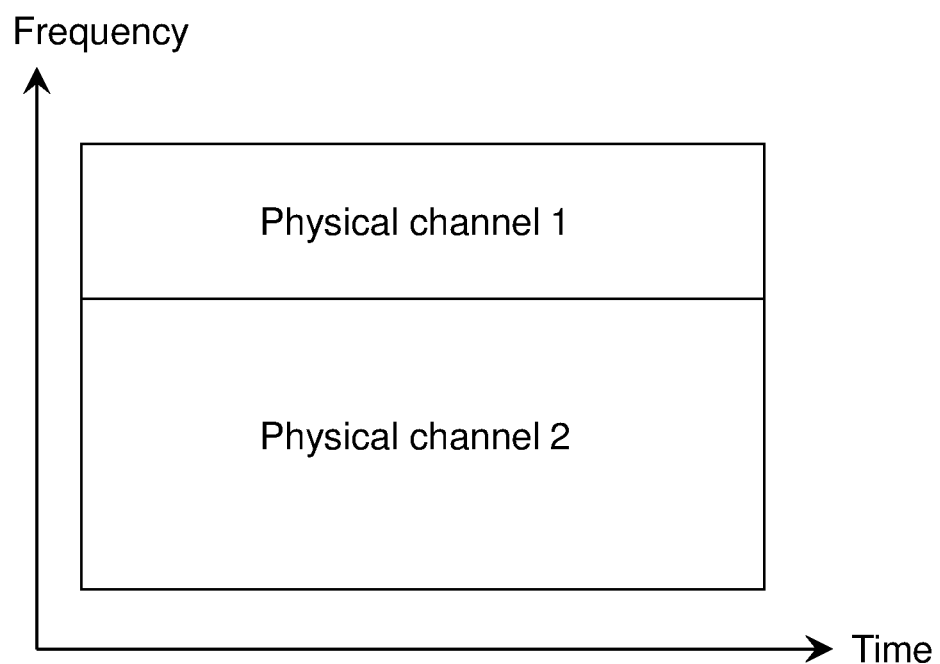
FIG. 3 is a schematic illustration of simultaneous multiple physical channels.
Figure 5:
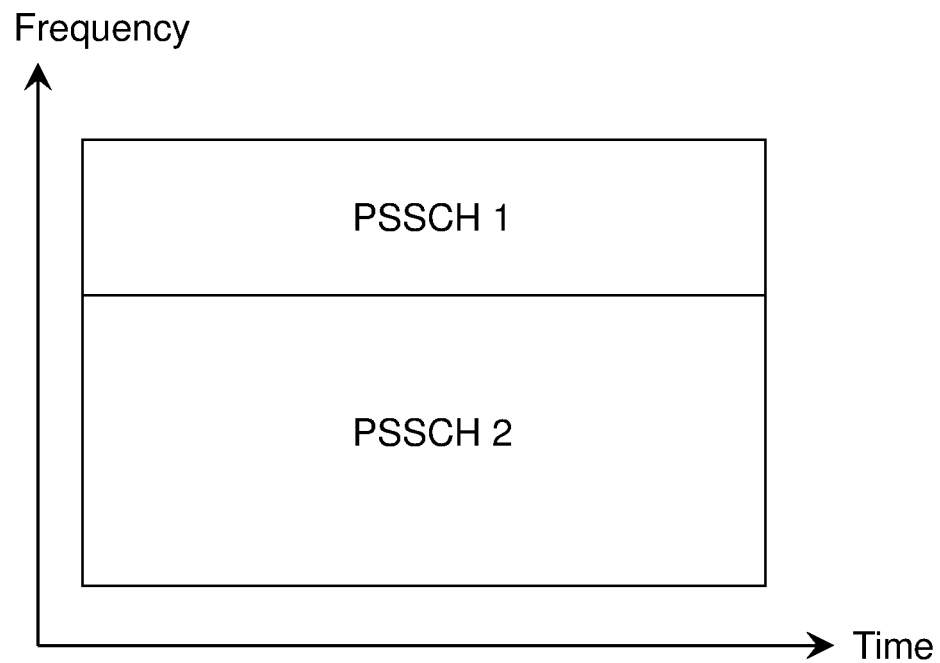
FIG. 5 is a schematic illustration of two different simultaneous PSSCH.

For example, the assignment may be of a DMRS sequence to simultaneous transmissions of physical channels that have different characteristics or requirements. An example of this type of transmission is schematically illustrated in FIG. 3 where two simultaneous physical channels are illustrated, e.g. simultaneous Physical Sidelink Control Channel (PSCCH), or its variants, and Physical Sidelink Control Channel (PSSCH) in a NR sidelink, as schematically illustrated in FIG. 4. Here it may be assumed that blind decoding is not needed for this type of PSCCH, which is potentially the case when the PSCCH carries some types of control information different from the scheduling assignment, e.g., feedback information. Another example of this type of simultaneous transmission is illustrated in FIG. 5, where two PSSCH transmissions are multiplexed in a Frequency Division Multiplex (FDM) manner. Here one of the PSSCH may carry data while the other one may carry feedback and/or control information.

A technical advantage of assigning a single reference signal sequence and/or a single DMRS port, hence a single DMRS sequence, for both physical channels is that a channel estimation algorithm using the whole long sequence will give better performance against noise/interference than if e.g. the wireless device 22 were using two short sequences separately. In particular, the impact of noise can be better suppressed by averaging over a larger number of samples in frequency. An equivalent effect can be achieved in the time domain. This advantage may be particularly useful for channels having a small number of allocated resource blocks.

Said characteristics may include at least one of Modulation and Coding Scheme, MCS, whether retransmission protocol is allowed, and a target reliability requirement.

Figure 6:
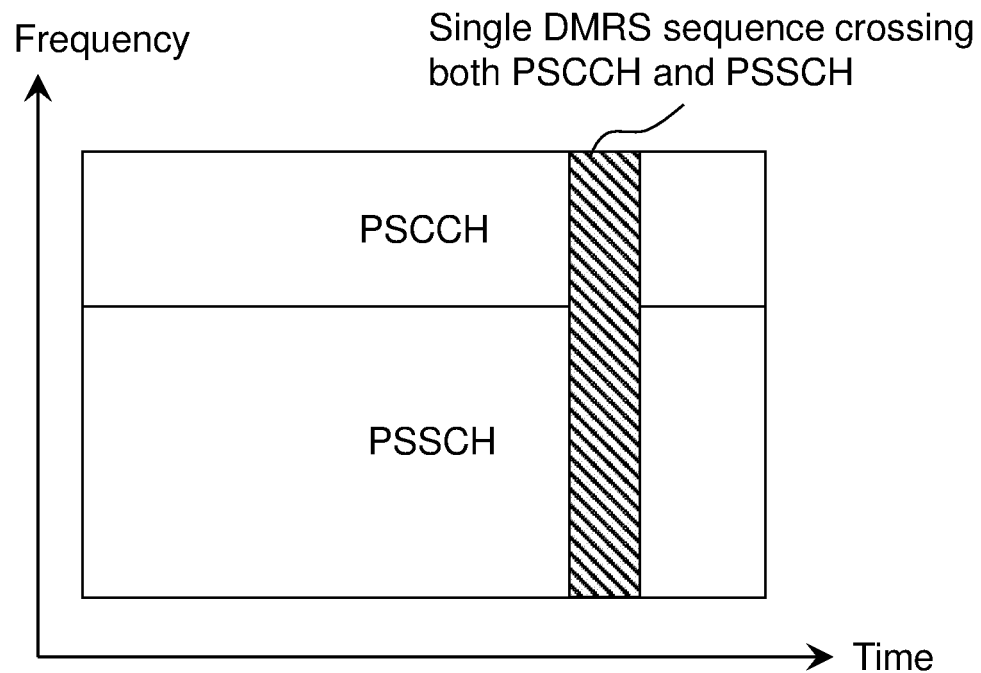
FIG. 6 is a schematic illustration of DMRS crossing both PSCCH and PSSCH.
Figure 7:
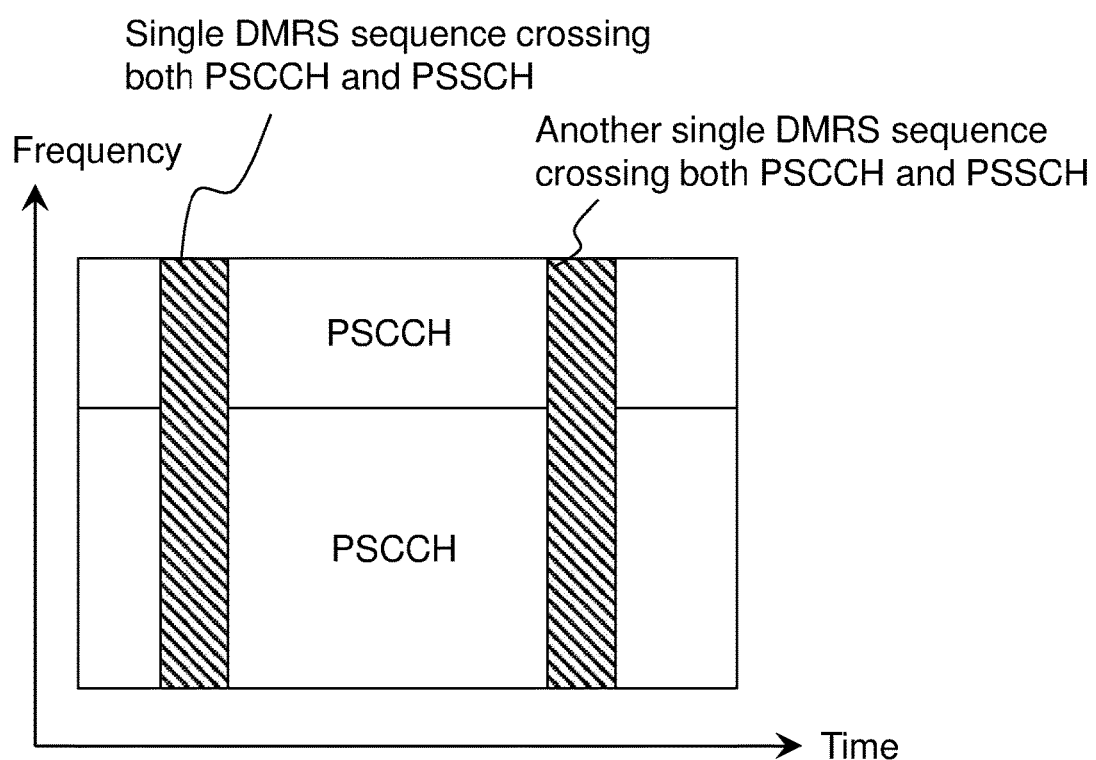
FIG. 7 is a schematic illustration of two DMRS per slot.

In some embodiments, for an Orthogonal Frequency Division Multiplex (OFDM) symbol carrying DMRS, a single DMRS sequence is assigned for each antenna port, where the single DMRS sequence crosses both the PSCCH and the PSSCH, as schematically shown in FIG. 6. Likewise, when there are multiple OFDM symbols carrying DMRS within a slot, a single DMRS sequence may be assigned to each OFDM symbol for each antenna port. FIG. 7 schematically illustrates the case of two DMRS symbols per slot.

In some embodiments, e.g. in the case of single DMRS symbols, multiple DMRS ports can be multiplexed in the frequency domain using a comb structure or in the code domain using Orthogonal Cover Codes (OCC) or cyclic shift. The power spectral density adjustment in the next action may follow in a similar way for content-specific channel estimation performance.

Action 202

The device provides an adjustment of a PSD of the single reference signal sequence in each physical channel of said physical channels in the frequency region occupied by the physical channel. That is, adjustment is in the frequency region of respective physical channel. For example, if the physical channels comprise a first physical channel, the adjustment of the PSD of the single reference signal sequence in the first physical channel is in the frequency region occupied by the first physical channel, adjustment of the PSD of the single reference signal sequence in a second physical channel is in the frequency region occupied by the second physical channel etc. Another way to describe it, as already explained above, is that the adjustment is of the PSD of subcarriers carrying the reference signal sequence.

The adjustment of the PSD may be based on said characteristics of the physical channel.

When the device is a wireless device, e.g. the wireless device 22a, as mentioned above, the wireless device is providing the adjustment of the PSD by adjusting the PSD, i.e. adjusting the PSD of the single reference signal sequence in each physical channel of said physical channels in the frequency region occupied by the physical channel. In some embodiments, the PSD is being adjusted by the wireless device based on a PSD value signalled, e.g. transmitted by, a network node, e.g. by the radio network node 16a, of said the wireless communication network and that the wireless device thus has received.

When the device is a network node, e.g. the radio network node 16a, of said wireless communication network, as mentioned above, said network node is providing the adjustment of PSD by signalling, e.g. transmitting, to one or more wireless devices, e.g. the wireless device 22a and/or 22b, a PSD value indicative of the adjustment of PSD. The signalling may e.g. be via Radio Resource Control (RRC), Downlink Control Information (DCI) or Medium Access Control Control Element (MAC CE).

Some embodiments provide for adjusting or controlling PSD of the subcarriers carrying the DMRS sequence. The general idea is that even though one DMRS sequence is used for both physical channels, different parts of the sequence can have different PSDs depending on the content carried by the channel and transmitted on that part of the spectrum. In other words, the setting of the power spectral density of the DMRS sequence may depend on the characteristics of the information carried on the associated physical channel(s). Hence, characteristics include many aspects, e.g. MCS being used, whether retransmission protocol is allowed, target reliability requirement, as already mentioned above, etc.

An advantage of such PSD adjustment or control mechanism is that it allows the control of the transmit power spent on the DMRS for each individual physical channel, assuming a total power constraint for the DMRS symbol. For example, since the reliability of transmitting feedback/control information cannot benefit from retransmission protocols as transmitting data, different transmit power and different MCSs may be applied to the PSCCH and the PSSCH.

There are two parameters that may be used to adjust the PSD on top of the same reference signal, e.g. DMRS, sequence:

The first parameter is the relative power density variation on different parts of the sequence with respect to a default power density. For simplicity, the default PSD can be chosen as the flat PSD. As such, for an allocated bandwidth of n subcarriers with a total power P, the default power density for each subcarrier is defines as $$\bar{P} = \frac{P}{n}.$$

Let $P_i$, $i \in [1:n]$ represent the actual power density for each subcarrier in the allocation and define the power density variation factor $$\alpha_i = \frac{P_i}{\bar{P}}.$$

Then the PSD variation can be fully captured by $\bar{P}$ and $\alpha_i$. In practice, to simplify the signaling, the number of possible values of $\alpha_i$ can be limited.

The second parameter is the ratio of Energy Per Resource Element (EPRE) of DMRS RE over the non-pilot (e.g., data payload or control payload) RE in the same spectrum. Denote the ratio of EPRE as $$\beta_i = \frac{epre - DMRS}{epre - DATA(or CONTROL)},$$

for $i \in [1:n]$ within the allocated BW, which captures the relative boosting of RSs compared with the data/control payload in the same spectrum. It is worth noting that there exists an alternative definition of β in which the numerator and denominator are swapped. In practice, the possible value of β can be limited to reduce signaling overhead.

Based on the definitions of α and β, the PSD subject to the DMRS sequence may be adjusted via either of them or both of them. Considering the embodiment illustrated in FIG. 5, the power density on subcarrier $i \in [1:n]$ where n is the number of subcarriers in the allocation, and may be defined as follows:

$P_L = \alpha_i * \bar{P}$, for all $i \in$ data/control payload $P_i = \beta_i * \alpha_i * \bar{P}$, for all $i \in$ data/control DMRS where $$\bar{P} = \frac{P}{n}$$

is the default power density depending on the total power P and the number of allocated subcarriers n, where P is the total power over the data/control payload.

To limit the possible values of $\alpha_i$ and $\beta_i$ and thus reduce signaling overhead, a feasible setting is to only enable an equal scaling within individual channels as follows:

$\alpha_i = \alpha_{PSSCH}, \beta_i = \beta_{PSSCH}$ for all $i \in$ data (e.g.,PSSCH), $\alpha_i = \alpha_{PSCCH}, \beta_i = \beta_{PSCCH}$ for all $i \in$ control (e.g., PSCCH).

Embodiments herein cover both types of parameters described above.

Hence, providing the adjustment of the PSD may relate to adjusting a power density relative to a default power density and/or by adjusting a ratio of EPRE to energy in one of a data signal and a control signal resource element associated with the reference signal sequence.

The adjustment of the PSD may be based on a MCS of the physical channel. For example, when multiple types of content are transmitted simultaneously sharing the same DMRS port, power allocation may be adjusted based on the used MCS. For example, the power spectral density for the bandwidth part with lower MCS is lower than the power spectral density for the bandwidth part with higher MCS. The PSD may thus depend on a MCS of the physical channel.

The adjustment of the PSD may be based on a protocol of retransmission of the physical channel. For example, in some embodiments, the power spectral density of the DMRS is adjusted based on the protocol of retransmission for different types of content. For instance, the power spectral density of content without retransmission is higher than that with retransmission. The PSD may thus depend on a protocol of retransmission, e.g. of a type of content, of the physical channel.

The adjustment of the PSD may be based on a targeted reliability of a content of the physical channel. For example, in some embodiments, the PSD of the DMRS is adjusted based on the targeted reliability. For higher reliability contents, the power spectral density may be boosted. The PSD may thus depend on a targeted reliability of a content of the physical channel.

The adjustment of the PSD may be based on a scheduled bandwidth of the physical channel. For example, in some embodiments, the power spectral density of the DMRS is adjusted based on the scheduled bandwidth of the associated physical channels. For example, the PSD of the single reference signal sequence in each channel may be inversely proportional to the scheduled bandwidth of that channel, i.e., equal power for each channel. The PSD may thus depend on a scheduled bandwidth of the physical channel.

The adjustment of the PSD may be based on a priority of the physical channel. For example, in some embodiments, the power spectral density of the DMRS is adjusted based on the priority of the associated physical channels. For example, the priority may be a mapping of the associated PPPP value. The PSD may thus depend on a priority of the physical channel.

The adjustment of the PSD may be based on type of the physical channel, e.g. based on if it is a control channel or data channel, i.e. a physical channel for carrying control information or data information as mentioned above. The adjustment may involve adjusting a PSD of the single reference signal sequence in a control channel of said physical channels to become a pre-specified amount greater than a PSD of the single reference signal sequence in a data channel of said physical channels. For example, in some embodiments, the power spectral density of the DMRS is adjusted based on the type of the physical channels. For example, the PSD of a control channel may be boosted by X dB compared to that of a data channel.

Moreover, the adjustment of the PSD may be according to a function of at least some of or all of the parameters above.

For example, in some embodiments, the DMRS power spectral density adjustment is a function of at least some of or all of the parameters above. The adjustment of the PSD may e.g. be based on a Cyclic Redundancy Check (CRC) of control channels which schedule the data transmissions.

In some embodiments, the adjustment of the PSDs, e.g. of the power spectral density of the reference signal sequence, e.g. DMRS sequence, is accomplished, such as being adjusted, via adapting EPRE ratios within one port. For instance, for the same DMRS port, two different EPRE ratios are defined, namely, $\beta_{DMRS,1}$ and $\beta_{DMRS,2}$ for bandwidth 1 and 2, respectively. $\beta_{DMRS,1}$ and $\beta_{DMRS,2}$ represent the relatively energy difference of pilot REs compared to the data/control payload in the same spectrum. The contents carried in the bandwidths serve different purposes such as control and data, respectively.

In some embodiments, the adjustment of the PSDs, e.g. of the power spectral density of the reference signal sequence, e.g. DMRS sequence, is accomplished, such as being adjusted, while keeping the EPRE ratios of DMRS RE over data and control payload RE the same, i.e., adjusting $\alpha_{bandwidth,1}$ and $\alpha_{bandwidth,2}$ while keeping $\beta_{DMRS,1}$ and $\beta_{DMRS,2}$ the same.

In general, the signaling of PSD adjustment may be achieved by signaling the power density variation factor, e.g. i.e., $\alpha_i$, and/or the EPRE ratio, e.g. i.e., $\beta_i$. Then, the corresponding PSD adjustment may be achieved by setting an appropriate value of amplitude scaling factor.

Action 203

The device may transmit the provided adjustment of the PSD of the single reference signal sequence in in each physical channel to one or more wireless devices, e.g. to wireless device 22a and/or wireless device 22b, that thus may receive it. The transmission may, as indicated above, e.g. be over a sidelink when the device is a wireless device and e.g. via RRC or DCI or MAC CE when the device is a network node. The provided adjustment of the PSD may be transmitted as a PSD value indicative of the adjustment of PSD, as also mentioned above.

When the device is the network node 16a, the PSD value may e.g. be transmitted to the wireless device 22a to be used for adjusting the PSD as discussed under action 202 and/or the PSD value may be transmitted to the wireless device 22b to e.g. be prepared for PSD adjustment as indicated by the PSD value, e.g. a PSD adjustment by wireless device 22a.

When the device is the wireless device 22a, the PSD value may be transmitted to the wireless device 22b to e.g. be prepared for PSD adjustment as indicated by the PSD value, e.g. a PSD adjustment by wireless device 22a.

As should be understood from the above, there may be multiple adjustments of PSD, e.g. in the form of PSD values, that are subject for transmission in the present action. For example, there may be one adjustment, e.g. in the form of PSD value, per physical channel being assigned the reference signal sequence.

A wireless device transmitting over a sidelink may herein and in the following be referred to as a sidelink transmitter and a wireless device receiving over a sidelink may herein and in the following be referred to as a sidelink receiver.

In some embodiments, the PSD adjustments, such as associated with different types of information, e.g., data and control information, are signaled from sidelink transmitter, e.g. the wireless device 22a, to sidelink receiver, e.g. the wireless device 22b, via conventional PSCCH that needs blind decoding. In this way, the receiver will know in advance what the used PSD coefficients are and may then apply the appropriate reception processing correspondingly.

In some embodiments, the network node, such as network node 16a, e.g. a gNB or eNB, signals the PSD adjustments associated with different types of information to the sidelink transmitter and/or sidelink receiver via RRC or DCI, as already indicated above.

In some embodiments, as already indicated, the PSD adjustments associated with different types of information are pre-configured. For example, a fixed 3 dB power of the PSCCH over the PSSCH may be pre-configured.

In some embodiments, some PSD adjustments are pre-configured, while other PSD adjustments are signaled. The other PSD adjustments may be signaled from sidelink transmitter, e.g. the wireless device 22a, to sidelink receiver, e.g. the wireless device 22b, via conventional PSCCH. In some other examples, the other PSD adjustments are signaled from a network node, such as the network node 16a, e.g. a gNB or eNB, to the sidelink transmitter, e.g. the wireless device 22a, and/or receiver, e.g. the wireless device 22b, via RRC or DCI.

The above embodiments concerning DMRS may be applied to also other types of reference signals, for example, a so called sidelink CSI-RS.

In some embodiments, the EPRE ratio of the DMRS RE over the data/control payload RE remains constant within the allocated bandwidth, and thus, the adjustment of power spectral density of the DMRS can be transparent to the receiver. A channel estimator that supports the transparent transmission typically targets on estimating the effective channels, i.e. the propagation channel coefficients with power scaling and precoding, instead of the true propagation channels.

In some embodiments, a channel estimator may handle the PSD difference in a non-transparent way by using different EPRE ratios. In this way, the PSD coefficient may be indicated by the associated EPRE ratio, while the PSD variation factor $\alpha$ may be set constant. Without loss of generality, assume $\alpha=1$. To give an example, for some channel estimators the prior assumption is that the effective channel coefficients at different tones have statistically equal power spectral density. Given the signaling methods presented above, the receiver may set an amplitude scaling factor for the sequence of the DMRS port on PSSCH to be $\sqrt{\beta_{DMRS,1}}$, and that for the sequence of the DMRS port on PSCCH to be $\sqrt{\beta_{DMRS,2}}$. In this way, the frequency channel estimates should be normalized such that the estimates have unified power spectral density level. For this purpose, a simple operation can be:

$$\widetilde{H}_1 = \frac{Y_1 * r_1 * \sqrt{\beta_{DMRS,1}}}{\beta_{DMRS,1}},$$

$$\widetilde{H}_2 = \frac{Y_2 * r_2 * \sqrt{\beta_{DMRS,2}}}{\beta_{DMRS,2}},$$

where $\widetilde{H}_1$ and $\widetilde{H}_2$ are the normalized outputs, e.g. scalar or vector, for the channels in PSSCH and PSCCH, respectively. $Y_i$, where i=1,2, is the received signal at the DMRS symbols for the respective bandwidth, and $r_i$ represents the sequence values accordingly.

Figure 8:
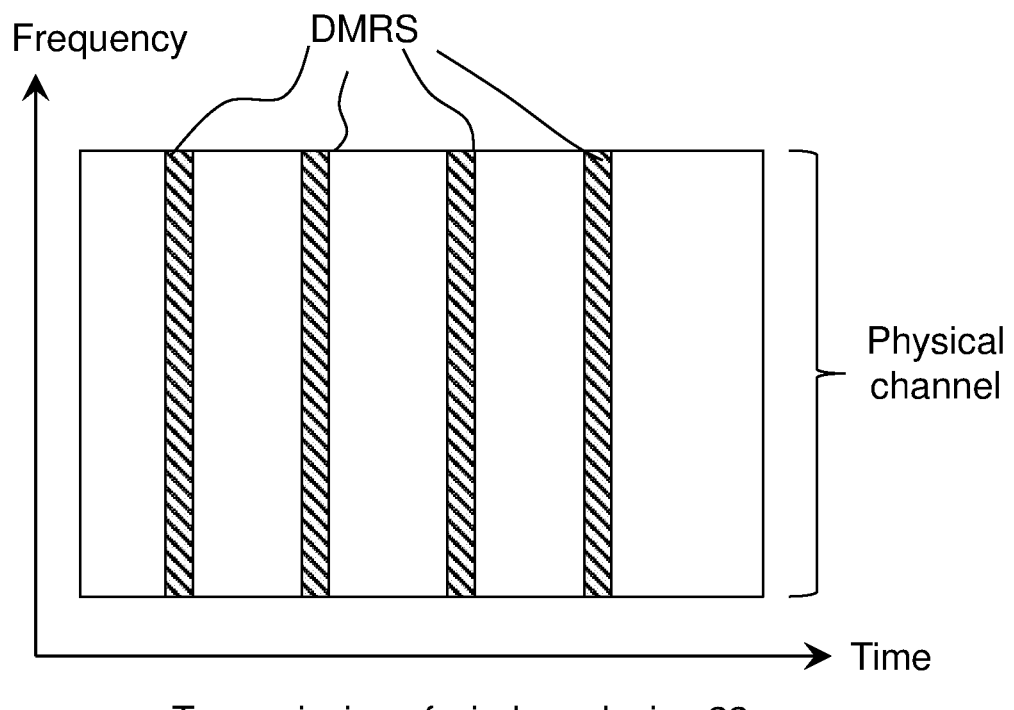
FIG. 8 is a schematic illustration of a wireless device using a whole sub channel to transmit a single physical channel and of another wireless device using a whole sub-channel to transmit two physical channels.
Figure 8:
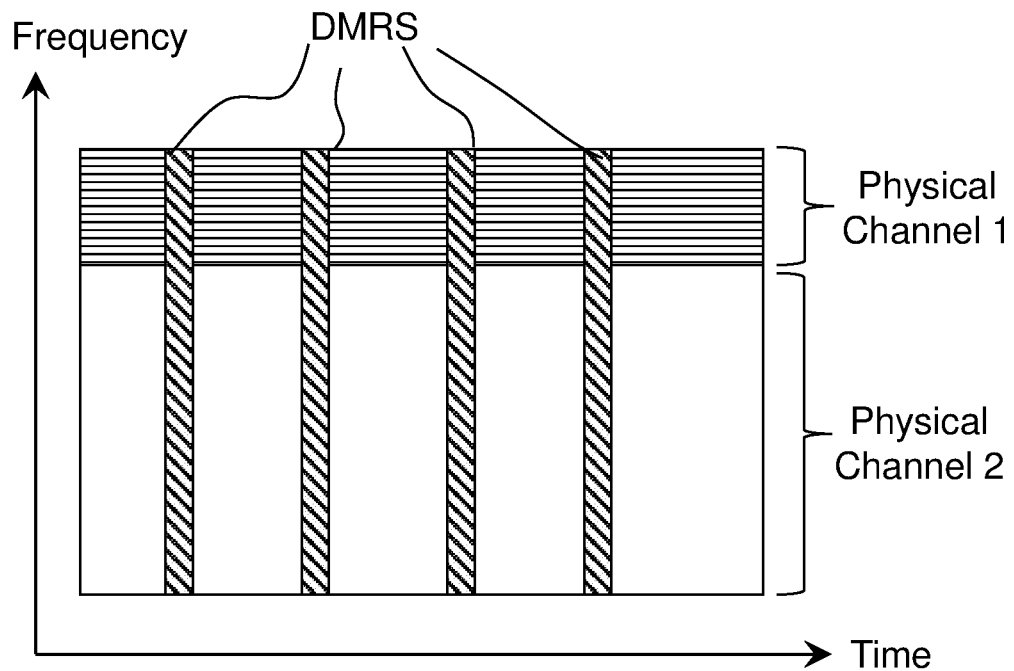

In addition to the technical advantages described above, some further advantages include the following:

One is related to the issue of pilot contamination due to the overlapping of multiple transmissions over the sidelink. One typical example is when a V2X resource pool is divided into sub channels in the frequency domain, e.g. similar to the LTE V2X sub channels. It may happen that a wireless device, e.g. the wireless device 22a, uses the whole sub channel to transmit a single physical channel, e.g. as shown at the top of FIG. 8, while another wireless device, e.g. the wireless device 22b, uses the sub channel to transmit two physical channels, e.g. as shown in FIG. 8 at the bottom. If e.g. wireless device 22b uses two DMRS sequences, one for each of its physical channels, then obviously, the DMRS sequences of wireless device 22a and wireless device 22b are not orthogonal to each other, hindering the channel estimation at a receiver that wants to decode either of or both transmissions. In contrast, thanks to embodiments described herein, wireless device 22b may use a single DMRS sequence for its transmission, making it possible to retain the desired orthogonality of the DMRS sequences used by wireless device 22a and wireless device 22b and therefore obtain a good channel estimation quality at the receiver.

Typical resource selection for V2X Mode 4 wireless devices, i.e. autonomous resource selection, e.g. wireless devices 22a-b, relies on the outcome of a sensing process during which each wireless device measures the Reference Signal Received Power (RSRP) of data transmissions whose control channel were successfully decoded. The measurement involves calculating the received power at the locations of reference signal sequences that are used for sensing. With the proposed method of assigning reference signal sequence, where a single reference signal sequence is assigned to cross both PSCCH and PSSCH, such as shown in FIG. 6, proper RSRP measurement can be performed even if different transmissions coexist in the same resource pool. Here, different transmissions mean some wireless devices(s), e.g. the wireless device 22a, use the resource pool/sub channel(s)/bandwidth to transmit pure PSSCH, while other wireless device(s), e.g. wireless device 22, use the same resource pool/sub channel(s)/bandwidth to transmit simultaneous PSCCH and PSSCH.

Figure 9:
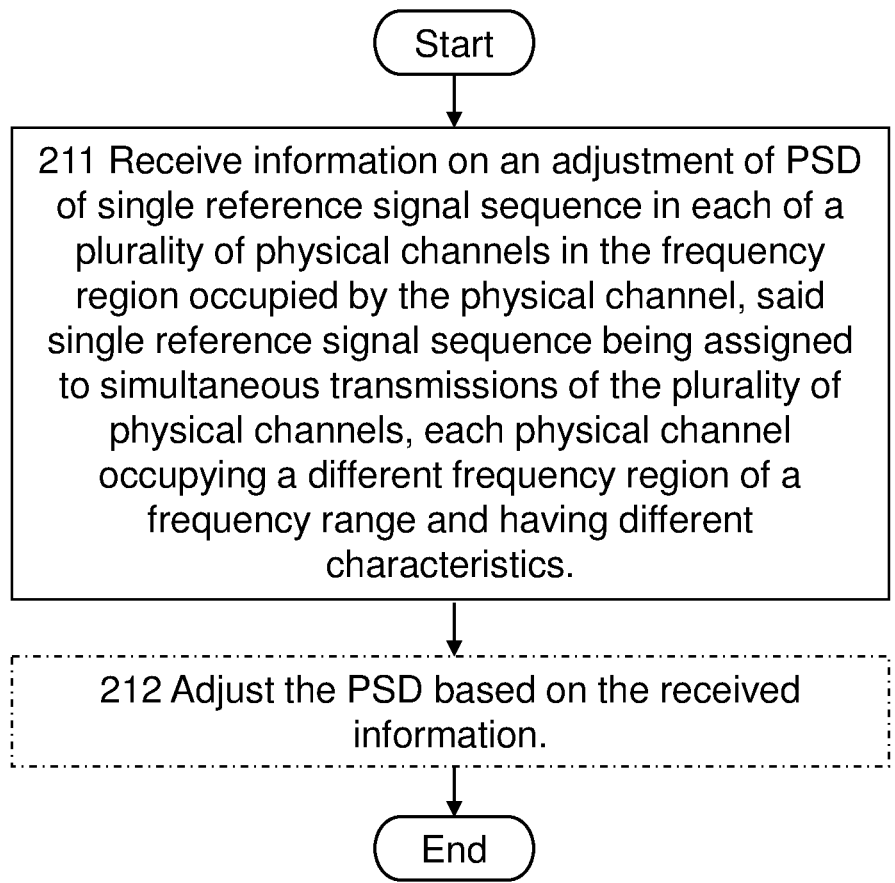
FIG. 9 is a flowchart for describing another method and actions according embodiments herein.

FIG. 9 is a flowchart schematically illustrating actions related to embodiments herein, e.g. a method or an exemplary process in, such as implemented by and/or performed by, a wireless device, e.g. the wireless device 22a or 22b. These embodiments relate to the situation indicated above in connection with FIG. 2 when a device, e.g. a network node or other wireless device, provide the adjustment of the PSD, such as in Action 202, by transmitting it, such as in Action 203. In some embodiments, the network node 16a transmits the adjustment for receipt by the wireless device 16a and in some embodiments, the wireless device 22b transmits the adjustment for receipt by the wireless device 22b.

Action 211

The wireless device receives, from a device, information on an adjustment of a PSD. In some embodiments, the wireless device 22a receives the information on the adjustment from the network node 16a, and in some embodiments the wireless device 22b receives the information on the adjustment from the wireless device 22a.

The adjustment of the PSD may be as discussed above in connection with FIG. 2. That is, the adjustment being of a single reference signal sequence in each of a plurality of physical channels in the frequency region occupied by the physical channel. The single reference signal sequence being assigned to simultaneous transmissions of the plurality of physical channels, each physical channel occupying a different frequency region of a frequency range and having different characteristics.

The information on the adjustment may comprise a PSD value indicative of the adjustment of PSD.

Action 212

The wireless device, e.g. the wireless device 22a or 22b, may adjust the PSD based on the received information.

Figure 10:
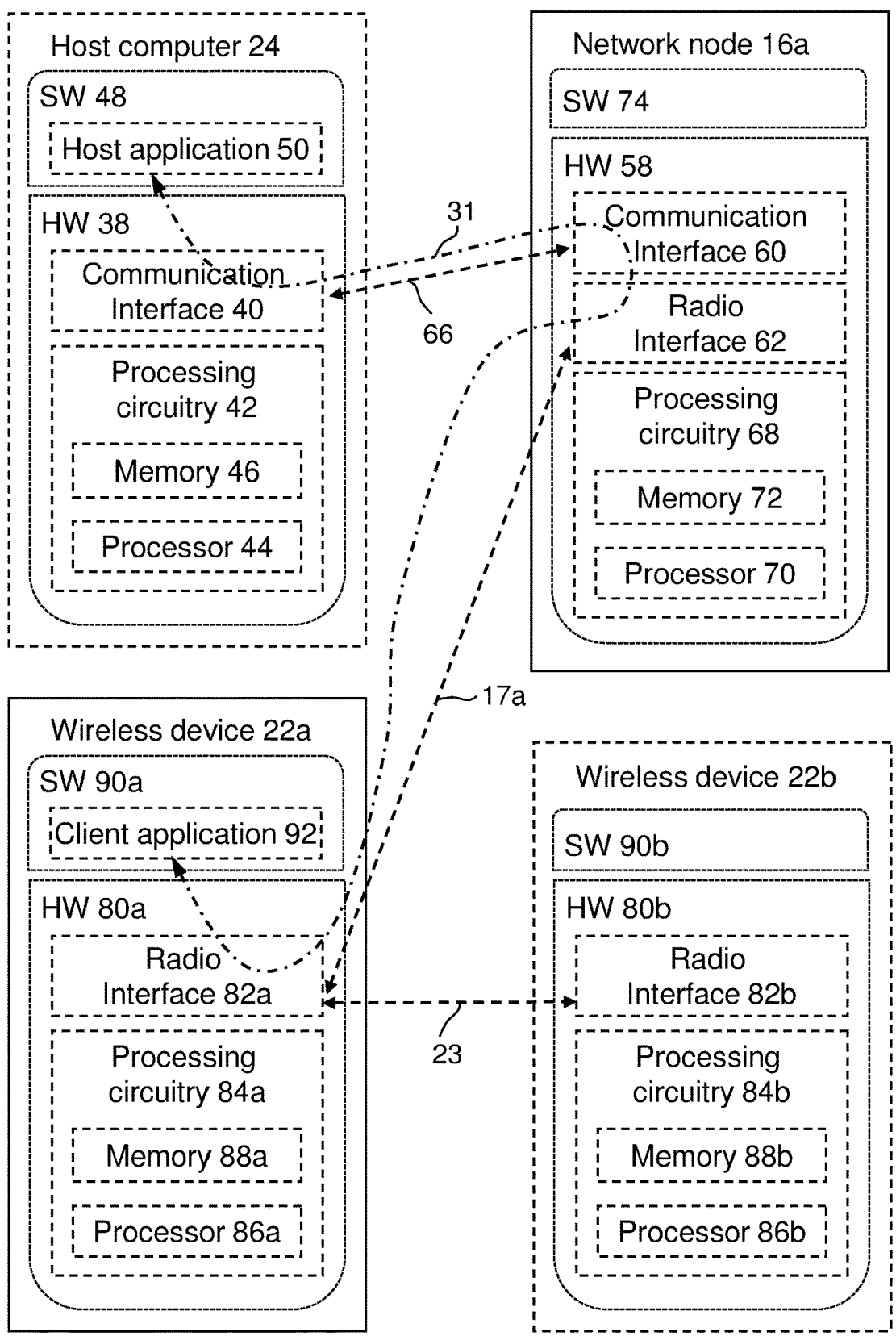
FIG. 10 is a block diagram schematically depicting host computer, a network node, and wireless devices, and how these may communicate with and/or via each other and how they may be configured according to and/or for carrying out embodiments herein.

FIG. 10 schematically illustrates example implementations of the wireless devices 22a-b, network node 16a and host computer 24, discussed in the preceding paragraphs.

The host computer 24 may comprise Hard Ware (HW) 38 including e.g. a communication interface 40 configured to set up and maintain a wired or wireless connection with an interface of a different communication device, e.g. of the wireless communication network 10. The host computer 24 may further comprise processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or Field Programmable Gate Array(s) (FPGA) and/or Application Specific Integrated Circuitry/s (ASIC) adapted to execute instructions. The processor 44 may be configured to access, e.g., write to and/or read from, memory 46, which may comprise any kind of volatile and/or non-volatile memory, e.g., cache and/or buffer memory and/or Random Access Memory (RAM) and/or Read-Only Memory (ROM) and/or optical memory and/or Erasable Programmable Read-Only Memory (EPROM).

The processing circuitry 42 and/or processor 44 may be configured to control and/or perform any method(s) and/or process(es) and/or action(s), and/or to cause such method(s), and/or process(es) and/or action(s), to be performed, by the host computer 24. Processor 44 corresponds to one or more processors, e.g. for performing host computer 24 functions described herein. The memory 46 may is configured to store data, programmatic software code and/or other information associated with the host computer 24, e.g. as described herein. The host computer 24 may further comprise Soft-Ware (SW) 48 that may comprise a host application 50. The software 48 and/or the host application 50 may include instructions that, when executed by the host computer 24, such as by the processor 44 and/or processing circuitry 42, causes the host computer 24 to perform actions and/r processes described or indicated herein with respect to host computer 24.

The software 48 may be executable by the processing circuitry 42. The host application 50 may be operable to e.g. provide a service to a remote user, such as corresponding to or operating a wireless device, e.g. the wireless device 22a, connecting via the OTT connection 31 that may terminate at the wireless device 22a and the host computer 24. In providing the service to the remote user, the host application 50 may provide user data which is transmitted using the OTT connection 31. The "user data" may be data and information described, e.g. over a connection and/or link relating to and/or benefitting from embodiments herein. The host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from a network node, e.g. the network node 16a and/or 16b, and or a wireless device, e.g. the wireless device 22a and/or 22b.

The network node 16a may comprise HW 58 enabling it to communicate with the host computer 24 and with wireless devices, e.g. the wireless device 22a. The hardware 58 may include a communication interface 60 for setting up and/or maintaining a wired or wireless connection with an interface of a different communication device, as well as a radio interface 62 for setting up and/or maintaining e.g. the wireless connection 17a with the wireless device 22a when e.g. located in coverage area 18a served by the network node 16a. The radio interface 62 may be formed as or may include, for example, one or more Radio Frequency (RF) transmitters, one or more RF receivers, and/or one or more RF transceivers. The communication interface 60 may be configured to facilitate a connection 66 to the host computer 24. The connection 66 may be direct or it may e.g. pass through the core network 14 and/or through one or more intermediate networks, e.g. the intermediate network 30, that may be external from, i.e. outside of, the wireless communication network 10.

The HW 58 may further include processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs and/or ASICs adapted to execute instructions. The processor 70 may be configured to access, e.g., write to and/or read from, the memory 72, which may comprise any kind of volatile and/or non-volatile memory, e.g., cache and/or buffer memory and/or RAM and/or ROM and/or optical memory and/or EPROM.

The network node 16 may further have SW 74 stored internally in, for example, memory 72, or stored in external memory, e.g. database, storage array, network storage device, etc., and e.g. accessible by the network node 16a via an external connection. The software 74 may be executable by the processing circuitry 68.

The processing circuitry 68 and/or processor 70 may be configured to control and/or perform any method(s) and/or process(es) and/or action(s), and/or to cause such method(s), and/or process(es) and/or action(s), to be performed, by the network node 16a. Processor 70 corresponds to one or more processors 70, e.g. for performing network node functions described herein. The memory 72 is configured to store data, programmatic software code and/or other information associated with the network node 16a, e.g. as described herein.

Further, the processing circuitry 68 of the network node 16a may include a PSD signaling unit (not shown) and/or similar unit(s) and/or modules(s) for performing actions and/or processes and/or methods relating to the network node 16a.

The SW 74 may include instructions that, when executed by the network node 16a, such as by the processor 70 and/or processing circuitry 68, causes the network node 16a, e.g. the processor 70 and/or processing circuitry 68 thereof, to perform the actions and/or processes described or indicated herein with respect to network node 16.

As should be realized, the network node 16a, may be configured, or operative, to execute the method and actions discussed above in relation to FIG. 2, in particular for embodiments when the device is a network node that may be the network node 16a. Hence:

The network node 16a and/or the processing circuitry 68 and/or the PSD signaling unit and/or the processor 70, may be operative, or configured, to execute Action 201, including e.g. to assign said single reference signal sequence to the simultaneous transmissions of the plurality of physical channels, each physical channel occupying a different frequency region of frequency range, each physical channel having different characteristics.

Further, the network node 16a and/or the processing circuitry 68 and/or the PSD signaling unit and/or the processor 70 and/or the radio interface 62, may be operative, or configured, to execute Action 202, including e.g. to provide said adjustment of PSD of the single reference signal sequence in each physical channel of said physical channels in the frequency region occupied by the physical channel. In particular to provide said adjustment by signaling to said one or more wireless devices said PSD value(s).

Moreover the network node 16a and/or the processing circuitry 68 and/or the PSD signaling unit and/or the processor 70 and/or the radio interface 62, may be operative, or configured, to execute Action 203, including e.g. to transmit the provided adjustment of the PSD of the single reference signal sequence in each physical channel to one or more wireless devices.

The wireless device 22a may comprise HW 80a that may include a radio interface 82a configured to set up and/or maintain e.g. the wireless connection 17a with the network node 16a that may serve coverage area 18a in which the wireless device 22a may currently be located. The radio interface 82a may also configured to set up and/or maintain the wireless connection 23 with the wireless device 22b via a radio interface 82b of the wireless device 22b. The wireless connection 23 may be referred to as a sidelink connection, or simply sidelink as already mentioned. The radio interface 82a may be formed as or may include, for example, one or more RF transmitters, one or more RF receivers, and/or one or more RF transceivers.

The HW 80a may further include processing circuitry 84a. The processing circuitry 84a may include a processor 86a and memory 88a. In particular, in addition to or instead of a processor, such as a central processing unit, and memory, the processing circuitry 84a may comprise integrated circuitry for processing and/or control, e.g., one or more processors and/or processor cores and/or FPGAs and/or ASICs adapted to execute instructions. The processor 86a may be configured to access, e.g. write to and/or read from, memory 88a, which may comprise any kind of volatile and/or non-volatile memory, e.g., cache and/or buffer memory and/or RAM and/or ROM and/or optical memory and/or EPROM.

The wireless device 22a may further comprise SW 90a, which is stored in, for example, memory 88a at the wireless device 22a, or stored in external memory, e.g. database, storage array, network storage device, etc., accessible by the wireless device 22a. The software 90a may be executable by the processing circuitry 84a. The software 90a may include a client application 92. The client application 92 may be operable to provide a service to a human or non-human user via the wireless device 22a, with the support of the host computer 24. In the host computer 24, the executing host application 50 may communicate with the executing client application 92 via the OTT connection 31 terminating at the wireless device 22a and the host computer 24. In providing the service to the user, the client application 92 may receive request data from the host application 50 and provide user data in response to the request data. The OTT connection 31 may transfer both the request data and the user data. The client application 92 may interact with the user to generate the user data that it provides.

The processing circuitry 84a and/or processor 86a may be configured to control and/or perform method(s) and/or process(es) and/or action(s), and/or to cause such method(s), and/or process(es) and/or action(s), to be performed, by the wireless device 22a. The processor 86a corresponds to one or more processors, e.g. for performing wireless device functions described herein. The memory 88 may be configured to store data, programmatic software code and/or other information, e.g. as described herein.

Further, the processing circuitry 84 of the wireless device 22a may include a PSD adjustment unit (not shown) and/or a reference signal assignment unit (not shown) and/or similar unit(s) and/or modules(s) for performing actions and/or processes and/or methods relating to the wireless device 22a.

The SW 90a and/or the client application 92 may include instructions that, when executed by the wireless communication device, such as by processor 86 and/or processing circuitry 84, causes the wireless device 22a, e.g. the processor 86 and/or processing circuitry 84 thereof, to perform the method(s) and/or process(es) and or actions(s) described or indicated herein with respect to the wireless device 22a.

As should be realized, the wireless device 22a, may be configured, or operative, to execute the method and actions discussed above in relation to FIG. 2 and/or FIG. 9, in particular for embodiments when the device is a wireless device that may be the wireless device 22a. Hence:

The wireless device 22a and/or the processing circuitry 84a and/or the reference signal assignment unit and/or the processor 86a, may be operative, or configured, to execute Action 201, including e.g. to assign said single reference signal sequence to the simultaneous transmissions of the plurality of physical channels, each physical channel occupying a different frequency region of frequency range, each physical channel having different characteristics.

Further, the wireless device 22a and/or the processing circuitry 84a and/or the PSD adjustment unit and/or the processor 86a and/or the radio interface 82a, may be operative, or configured, to execute Action 202, including e.g. to provide said adjustment of PSD of the single reference signal sequence in each physical channel of said physical channels in the frequency region occupied by the physical channel. In particular to provide said adjustment by adjusting PSD of the single reference signal sequence in each physical channel of said physical channels in the frequency region occupied by the physical channel.

Moreover, the wireless device 22a and/or the processing circuitry 84a and/or the PSD adjustment unit and/or the processor 86a and/or the radio interface 82a, may be operative, or configured, to execute Action 203, including e.g. to transmit the provided adjustment of the PSD of the single reference signal sequence in each physical channel to one or more wireless devices, e.g. to the wireless device 22b over a sidelink, e.g. the wireless connection 23.

Furthermore, the wireless device 22a and/or the processing circuitry 84a and/or the processor 86a, and/or the radio interface 82a may be operative, or configured, to execute Action 211, including e.g. to receive said information on the adjustment of the PSD.

Moreover, the wireless device 22a and/or the processing circuitry 84a and/or the PSD adjustment unit and/or the processor 86a, may be operative, or configured, to execute Action 212, including e.g. to adjust the PSD based on the received information.

As seen in the figure, the wireless device 22b comprises a HW 80b, a radio interface 82b, a processing circuitry 84b, a memory 88b and a processor 88b, as well as a SW 90b, i.e. corresponding parts as the wireless device 22a. In general, the wireless device 22b may comprise corresponding parts as the wireless device 22a, and may be configured correspondingly as just described for the wireless device 22a in the preceding paragraphs.

For example:

The wireless device 22b and/or the processing circuitry 84b and/or the processor 86b, and/or the radio interface 82b may be operative, or configured, to execute Action 211, including e.g. to receive said information on the adjustment of the PSD.

Moreover, the wireless device 22b and/or the processing circuitry 84b and/or a PSD adjustment unit and/or the processor 86b, may be operative, or configured, to execute Action 212, including e.g. to adjust the PSD based on the received information.

The inner workings, such as shown and discussed parts, each of the network node 16a, wireless devices 22a-b, and the host computer 24 may independently be as shown in FIG. 10 and each, some or all of them may be comprised in a surrounding network topology as in FIG. 1.

As should be understood, embodiments herein may e.g. apply to wireless connection 23, i.e. sidelink, between the wireless devices 22a-b and/or to wireless connection 17a between network node 16a and wireless device 22a.

Note that in FIG. 10, the OTT connection 31 has been drawn abstractly to illustrate the communication between the host computer 24 and the wireless device 22a via the network node 16a, without explicit reference to any intermediary devices and the precise routing of messages via these devices. Network infrastructure may determine the routing, which it may be configured to hide from the wireless device 22a or from the service provider operating the host computer 24, or both. While the OTT connection 31 is active, the network infrastructure may further take decisions by which it dynamically changes the routing, e.g. on the basis of load balancing consideration or reconfiguration of the network.

Embodiments herein may improve the performance of OTT services provided to the wireless device 22a and/or the wireless device 22b using the OTT connection 31, in which the wireless connection 17a and/or 23 may form the last segment.

For example, a service provider may though host computer 24 and the host application provide services over the OOT connection to the wireless communication device 22a and the client application 92. The service may be provided on request by the wireless device 22a via a user thereof and/or may be provided by the service provider, e.g. based on agreement or other reasons. The OTT connection may during set up or during provision of the service by over a connection with adjustment of PSD as in embodiments herein. Although not shown in FIG. 10, the OTT connection 31 may in some embodiments continue from wireless device 22a, i.e. via wireless device 22a, to wireless device 22b over the wireless connection 23, i.e. a sidelink, that may be subject for adjusted PSD according to embodiments herein. A service, e.g. involving provision of data, over a an OTT connection, e.g. the OTT connection 31, i.e. an OTT service, may benefit from embodiments herein in that it thereby may be possible to provide the OTT service at all and/or at better quality than else would be the case since embodiments herein enable improved performance against noise and/or interference as mentioned above. For example, it may be possible to reach the wireless device 22b with an OTT service over an OTTO connection from wireless device 22a via the wireless connection 23, i.e. via sidelink, thanks to embodiments herein.

In some embodiments, a measurement procedure may be provided for the purpose of monitoring data rate, latency and other factors on which embodiments herein may improve. There may further be an optional network functionality for reconfiguring an OTT connection, e.g. the OTT connection 31, between the host computer 24 and wireless device 22a and/or wireless device 22b, in response to variations in the measurement results. The measurement procedure and/or the network functionality for reconfiguring the OTT connection 31 may e.g. be implemented in the software 48 of the host computer 24 or in the software 90 of the WD 22, or both. In embodiments, sensors (not shown) may be deployed in or in association with communication devices through which the OTT connection 31 passes; the sensors may participate in the measurement procedure by supplying values of the monitored quantities exemplified above, or supplying values of other physical quantities from which software 48, 90 may compute or estimate the monitored quantities. The reconfiguring of the OTT connection 31 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary wireless device signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the wireless device 22a and/or the wireless device 22b.

In some embodiments, the network node 16a is configured to, and/or the network node's 16a processing circuitry 68 is configured to perform functions and/or methods described herein for preparing and/or initiating and/or maintaining and/or supporting and/or ending a transmission to one or more of the wireless devices 22a-b, and/or for preparing and/or initiating and/or maintaining and/or supporting and/or ending in receipt of a transmission from one or more of the wireless devices 22a-b.

In some embodiments, at least one of the wireless devices 22a-b is configured to, and/or comprises a radio interface 82 and/or processing circuitry 84 configured to, perform functions and/or methods described herein for preparing and/or initiating and/or maintaining and/or supporting and/or ending a transmission to the network node 16a, and/or preparing and/or initiating and/or maintaining and/or supporting and/or ending in receipt of a transmission from the network node 16a.

Although the above mentioned "units" such as PSD signaling unit (not shown) and PSD adjustment unit (not shown) may be implemented within a respective processing circuitry and/or processor, it is contemplated that these units may be implemented such that a portion of the units may be stored in a corresponding memory within the processing circuitry. In other words, the units may be implemented in hardware and/or software, e.g. within the respective processing circuitry.

Figure 11:
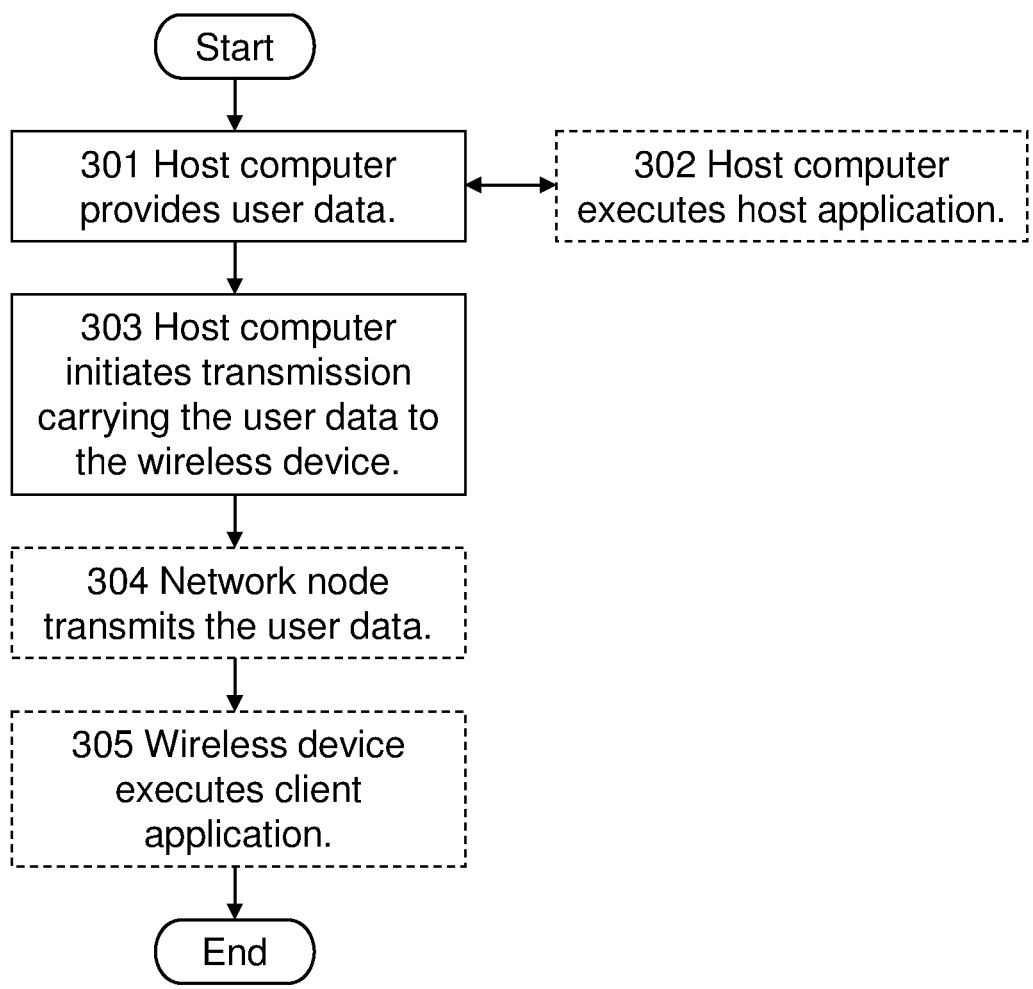
FIG. 11 is a flowchart of an exemplary method of a host computer initiating transmission to a wireless device via a network node.

FIG. 11 is a flowchart illustrating an exemplary method implemented in a communication system, such as, for example, comprising the wireless communication network 10. In a first step 301 of the method, the host computer 24 may provide user data. In an optional sub step 302 of the first step 311, the host computer 24 provides the user data by executing a host application, such as, for example, the host application 50. In a second step 303, the host computer 24 initiates a transmission carrying the user data to a wireless device, e.g. the wireless device 22a or 22b. In an optional third step 304, a network node, e.g. the network node 16a, transmits to the wireless device the user data which was carried in the transmission that the host computer 24 initiated. The transmission to the wireless device may be over a connection that may be subject to the teachings of embodiments described throughout this disclosure, i.e. may e.g. be over the wireless connection 17a and/or 23.

In an optional fourth step 305, the wireless device executes a client application, such as, for example, the client application 92, associated with the host application 50 executed by the host computer 24.

In other words, the host computer may in step 301 provide user data and in step 303 initiate transmission carrying the user data, via a network node, e.g. the network node 16a, to the wireless device, e.g. the wireless device 22a, and/or initiate transmission carrying the user data via the wireless device 22a to the wireless device 22b. The user data thus being carried over e.g. wireless connection 17a and/or 23. At least one of the network node and the wireless device involved may be configured as described above for performing the method and/or actions discussed in relation to FIG. 2 and/or FIG. 9, whereby the transmission initiated by the host computer 24 may benefit from embodiments herein. That is, the transmission may be via a device that e.g. may be the network node 16a or wireless device 22a configured as described above for performing the method and/or actions discussed in relation to FIG. 2 and/or FIG. 9.

In conclusion, for initiating transmission of user data towards a wireless device, e.g. the wireless device 22a or 22b, in a wireless communication network, e.g. the wireless communication network 10, a host computer, e.g. the host computer 24, may provide, e.g. in step 301, the user data. The host computer may then, e.g. in step 303, initiate the transmission of the user data toward the wireless device is via a device, e.g. the network node 16a or the wireless device 22a, configured according to embodiments herein, i.e. as described above, or in other words for performing the method and/or actions discussed in relation to FIG. 2 and/or FIG. 9.

Figure 12:
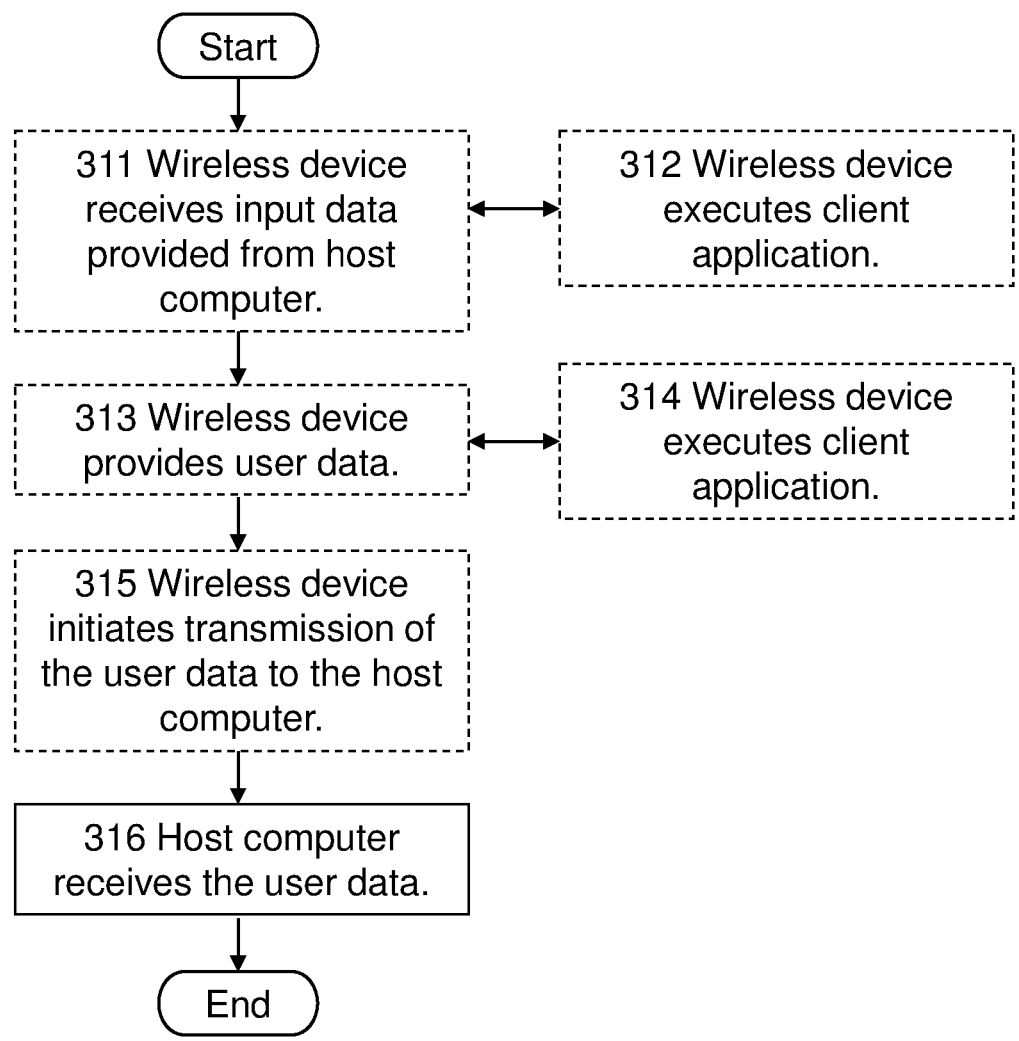
FIG. 12 is a flowchart of another exemplary method of a host computer receiving data from a wireless device.

FIG. 12 is a flowchart illustrating an exemplary method implemented in a communication system, such as, for example, comprising the wireless communication network 10. In an optional first step 311 of the method, a wireless device, e.g. any one of the wireless devices 22a-b, receives input data provided by the host computer 24. In an optional sub step 312 of the first step, the wireless device executes a client application, e.g. the client application 92, which provides the user data in reaction to the received input data provided by the host computer 24. Additionally or alternatively, in an optional second step 313, the wireless device provides user data. In an optional sub step 314 of the second step, the wireless device provides the user data by executing a client application, such as, for example, client application 92. In providing the user data, the executed client application 92 may further consider user input received from a user of the wireless device. Regardless of the specific manner in which the user data was provided, the wireless device may initiate, in an optional third sub step 315, transmission of the user data to the host computer 24. In a fourth step 316 of the method, the host computer 24 receives the user data transmitted from the wireless device. The received transmission may be over a connection that may be subject to the teachings of embodiments described throughout this disclosure, i.e. may e.g. be over the wireless connection 17a and/or 23.

In other words, the host computer may in step 316 receive the transmission of user data from a wireless device, e.g. the wireless device 22a and/or the wireless device 22b via a network node, e.g. the network node 16a, and thus over e.g. wireless connection 17a and/or 23. At least one of the network node and the wireless device involved may be configured as described above for performing the method and/or actions discussed in relation to FIG. 2 and/or FIG. 9, whereby the transmission received by the host computer 24 may benefit from embodiments herein. That is, the transmission may be via a device that e.g. may be the network node 16a or wireless device 22a configured as described above for performing the method and/or actions discussed in relation to FIG. 2 and/or FIG. 9.

In conclusion, for receiving transmission of user data from a wireless device, e.g. the wireless device 22a or 22b, in a wireless communication network, e.g. the wireless communication network 10, a host computer, e.g. the host computer 24, may receive, in e.g. step 316, the transmission of the user data via a device, e.g. the network node 16a or the wireless device 22a, configured according to embodiments herein, i.e. as described above, or in other words for performing the method and/or actions discussed in relation to FIG. 2 and/or FIG. 9.

Note that the presentation of solutions herein refers to different types of information as feedback/control information, which may be referred to herein, collectively, as control information, and data information. However, more general information types can be supported. Also, although a proposed solution is described in the context of two physical channels multiplexed in the frequency domain, extension to more than two channels is contemplated.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, embodiments herein may take the form of a computer program product, on e.g. a tangible computer usable storage medium, having computer program code, e.g. embodied in the medium, that can be executed e.g. by a computer or device with computer and/or data processing capabilities, such as by a device comprising a processor or processing circuitry, such as e.g. the wireless device 22a and the network node 16a, as discussed above. Any suitable tangible computer readable medium may be utilized for comprising, i.e. storage of, the computer program code, including e.g. hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, to thereby create a special purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The computer program code may execute entirely on a user's computer, partly on a user's computer, as a stand-alone software package, partly on a user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Figure 13:
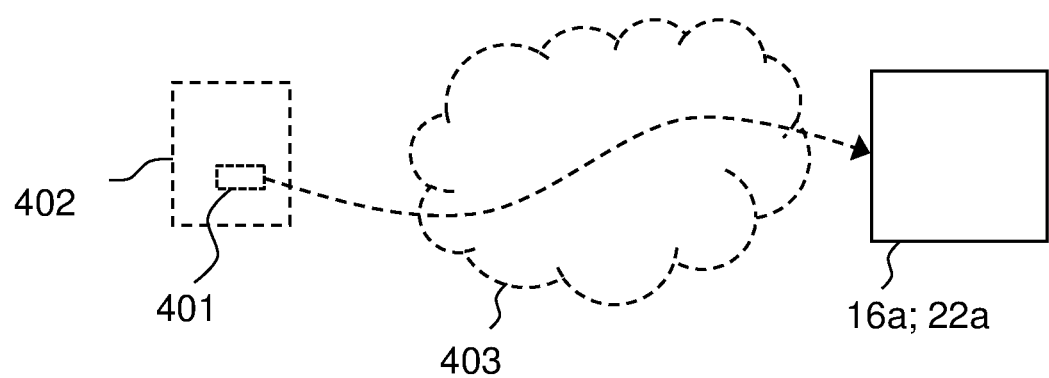
FIG. 13 is a schematic drawing illustrating embodiments relating to a computer program, and storage medium thereof.

FIG. 13 schematically shows a computer program 401, e.g. said computer program product, that may be comprised on a computer readable storage medium 402. The computer program 401 is comprising computer program instructions or code that when executed by a device, e.g. the network node 16a or the wireless device 22a, such as by processing circuitry and/or a processor thereof, causes the device to perform the method and/or actions discussed above in relation to FIG. 2 and/or FIG. 9. The computer program 401 may be downloadable over or via a computer network 403, e.g. a LAN, WAN and/or the Internet, directly or indirectly to the device.

It is to be understood that the functions/acts noted in blocks in the drawings may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and sub combination of these embodiments. Accordingly, all embodiments can be combined in any way and/or combination, and the present specification, including the drawings, shall be construed to constitute a complete written description of all combinations and sub combinations of the embodiments described herein, and of the manner and process of making and using them, and shall support claims to any such combination or sub combination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in e.g. a radio network, i.e. a radio network node, which may further comprise any of Base Station (BS), Radio Base Station (RBS), Base Transceiver Station (BTS), Base Station Controller (BSC), Radio Network controller (RNC), g Node B (gNB), evolved Node B (eNB or eNodeB), Node B, Multi-Standard Radio (MSR) radio node such as MSR BS, multi-cell/Multicast Coordination Entity (MCE), relay node, donor node controlling relay, radio Access Point (AP), transmission points, transmission nodes, Remote Radio Unit (RRU) Remote Radio Head (RRH), a core network node, e.g. Mobile management entity (MME), Self-Organizing Network (SON) node, a coordinating node, positioning node, an external node, e.g., 3rd party node i.e. a node external to the current network, nodes in Distributed Antenna System (DAS), a Spectrum Access System (SAS) node, an Element Management System (EMS), etc. The network node may also include test equipment. The term "radio node" may be used herein to also denote a wireless device or WD, as well as a radio network node.

Wireless device or a UE may herein be used interchangeably. Wireless device as used herein may be any type of wireless device capable of communicating with a network node or another wireless device over radio signals, such as another wireless device. The wireless device may correspond to a radio communication device, target device, D2D wireless device, machine type of wireless device or wireless device capable of Machine to Machine (M2M) communication, a low-cost and/or low-complexity wireless device, a tablet wireless device, a mobile terminal, a smart phone, a Laptop Embedded Equipment (LEE), Laptop Mounted Equipment (LME), USB dongle, Customer Premises Equipment (CPE), an Internet of Things (IoT) device, or a Narrowband IoT (NB-IOT) device etc.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms, including technical and scientific terms, used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Any processing module(s) and circuit(s) mentioned in the foregoing may be implemented as a software and/or hardware module, e.g. in existing hardware and/or as an ASIC, a FPGA or the like. Also note that any hardware module(s) and/or circuit(s) mentioned in the foregoing may e.g. be included in a single ASIC or FPGA, or be distributed among several separate hardware components, whether individually packaged or assembled into a System-on-a-Chip (SoC).

Those skilled in the art will also appreciate that the modules and circuitry discussed herein may refer to a combination of hardware modules, software modules, analogue and digital circuits, and/or one or more processors configured with software and/or firmware, e.g. stored in memory, that, when executed by the one or more processors may make the node(s) and device(s) to be configured to and/or to perform the above-described methods and actions.

Identification by any identifier herein may be implicit or explicit. The identification may be unique in a certain context, e.g. in the wireless communication network or at least in a relevant part or area thereof.

In addition to the above explanation, the term "network node" or simply "node" as may be used herein may as such refer to any type of node. e.g. in the form of a device, that may communicate with another node in and be comprised in a communication network, e.g. Internet Protocol (IP) network and/or wireless communication network. Further, such node may be or be comprised in a radio network node, e.g. as described above, or any network node, which e.g. may communicate with a radio network node.

As used herein, the term "memory" may refer to a data memory for storing digital information, typically a hard disk, a magnetic storage, medium, a portable computer diskette or disc, flash memory, Random Access Memory (RAM) or the like. Furthermore, the memory may be an internal register memory of a processor.

As used herein, the terms "number" or "value" may refer to any kind of digit, such as binary, real, imaginary or rational number or the like. Moreover, "number" or "value" may be one or more characters, such as a letter or a string of letters. Also, "number" or "value" may be represented by a bit string.

As used herein, the expression "may" and "in some embodiments" has typically been used to indicate that the features described may be combined with any other embodiment disclosed herein.

In the drawings, features that may be present in only some embodiments may be drawn using dotted or dashed lines.

As used herein, the expression "transmit" and "send" are typically interchangeable. These expressions may include transmission by broadcasting, uni-casting, group-casting and the like. In this context, a transmission by broadcasting may be received and decoded by any authorized device within range. In case of unicasting, one specifically addressed device may receive and encode the transmission. In case of group-casting, e.g. multicasting, a group of specifically addressed devices may receive and decode the transmission.

When using the word "comprise" or "comprising" it shall be interpreted as nonlimiting, i.e. meaning "consist at least of".

The embodiments herein are not limited to the above described embodiments. Various alternatives, modifications and equivalents may be used. Therefore, the above embodiments should not be taken as limiting the scope of the present disclosure, which is defined by the appending claims.

The invention claimed is:

1. A method, performed by a device, for providing adjustments of power spectral densities associated with a reference signal sequence in a wireless communication network, the method comprising:
    assigning a single reference signal sequence to simultaneous transmissions of a plurality of physical channels, each physical channel occupying a different frequency region of a frequency range, each physical channel having different characteristics; and
    providing an adjustment of a Power Spectral Density, PSD, of the single reference signal sequence in each physical channel of the plurality of physical channels in the frequency region occupied by the respective physical channel, the providing the adjustment of the PSD relating to adjusting the PSD by adjusting a ratio of Energy Per Resource Element, EPRE, to energy in one of a data signal and a control signal resource element associated with the single reference signal sequence.

2. The method as claimed in claim 1, wherein the device is a wireless device and the wireless device is providing the adjustment of the PSD by adjusting the PSD.

3. The method as claimed in claim 2, wherein the PSD is adjusted based on a PSD value signalled by a network node of the wireless communication network.

4. The method as claimed in claim 1, wherein the device is a network node of the wireless communication network and the network node is providing the adjustment of PSD by signalling, to one or more wireless devices, a PSD value indicative of the adjustment of PSD.

5. The method as claimed in claim 1, wherein the adjustment of the PSD involves adjusting a PSD of the single reference signal sequence in a control channel of the plurality of physical channels to become a pre-specified amount greater than a PSD of the single reference signal sequence in a data channel of the plurality of physical channels.

6. The method of as claimed in claim 1, wherein the method further comprises:
    transmitting the provided adjustment of PSD of the single reference signal sequence in each physical channel to one or more wireless devices.

7. A device for providing adjustments of power spectral densities associated with a reference signal sequence in a wireless communication network, the device being configured to:
    assign a single reference signal sequence to simultaneous transmissions of a plurality of physical channels, each physical channel occupying a different frequency region of a frequency range, each physical channel having different characteristics; and
    provide an adjustment of a Power Spectral Density, PSD, of the single reference signal sequence in each physical channel of the plurality of physical channels in the frequency region occupied by the respective physical channel, the providing the adjustment of the PSD relating to adjusting the PSD by adjusting a ratio of Energy Per Resource Element, EPRE, to energy in one of a data signal and a control signal resource element associated with the single reference signal sequence.

8. The device as claimed in claim 7, wherein the device is a wireless device and the wireless device is providing the adjustment of the PSD by adjusting the PSD.

9. The device as claimed in claim 8, wherein the PSD is adjusted based on a PSD value signaled by a network node of the wireless communication network.

10. The device as claimed in claim 7, wherein the device is a network node of the wireless communication network and the network node is providing the adjustment of PSD by signaling, to one or more wireless devices, a PSD value indicative of the adjustment of PSD.

11. The device as claimed in claim 7, wherein the adjustment of the PSD involves adjusting a PSD of the single reference signal sequence in a control channel of the plurality of physical channels to become a pre-specified amount greater than a PSD of the single reference signal sequence in a data channel of the plurality of physical channels.

12. The device as claimed in claim 7, wherein the device is further configured to transmit the provided adjustment of PSD of the single reference signal sequence in each physical channel to one or more wireless devices.

13. A method, performed by a wireless device operating in a wireless communication network, comprising:
    receiving, from a device, information on an adjustment of a Power Spectral Density, PSD, of a single reference signal sequence in each of a plurality of physical channels in the frequency region occupied by the respective physical channel, the single reference signal sequence being assigned to simultaneous transmissions of the plurality of physical channels, each physical channel occupying a different frequency region of a frequency range and having different characteristics, the receiving information on the adjustment of the PSD relating to adjusting the PSD by adjusting a ratio of Energy Per Resource Element, EPRE, to energy in one of a data signal and a control signal resource element associated with the single reference signal sequence.

14. The method as claimed in claim 13, wherein the method further comprises:
adjusting the PSD based on the received information.

15. The method as claimed in claim 13, wherein the information on the adjustment comprises a PSD value indicative of the adjustment of PSD.

16. A wireless device configured to:
operate in a wireless communication network; and
receive, from a device, information on an adjustment of a Power Spectral Density, PSD, of a single reference signal sequence in each of a plurality of physical channels in the frequency region occupied by the respective physical channel, the single reference signal sequence being assigned to simultaneous transmissions of the plurality of physical channels, each physical channel occupying a different frequency region of a frequency range and having different characteristics, the receiving information on the adjustment of the PSD relating to adjusting the PSD by adjusting a ratio of Energy Per Resource Element, EPRE, to energy in one of a data signal and a control signal resource element associated with the single reference signal sequence.

17. The wireless device as claimed in claim 16, wherein the wireless device wireless device is further configured to adjust the PSD based on the received information.

18. The wireless device as claimed in claim 16, wherein the information on the adjustment comprises a PSD value indicative of the adjustment of PSD.

\* \* \* \* \*